US011996644B2

(12) United States Patent
Hara et al.

(10) Patent No.: US 11,996,644 B2
(45) Date of Patent: May 28, 2024

(54) TERMINAL

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP); TOYOTA JIDOSHA KABUSHIKI KAISHA, Toyota (JP)

(72) Inventors: Teruo Hara, Yokkaichi (JP); Hajime Kawase, Yokkaichi (JP); Masaaki Tabata, Yokkaichi (JP); Hajime Matsui, Yokkaichi (JP); Hiroshi Kobayashi, Okazaki (JP); Takeshi Amakawa, Toyota (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 373 days.

(21) Appl. No.: 17/613,553

(22) PCT Filed: May 25, 2020

(86) PCT No.: PCT/JP2020/020577
§ 371 (c)(1),
(2) Date: Nov. 23, 2021

(87) PCT Pub. No.: WO2020/250656
PCT Pub. Date: Dec. 17, 2020

(65) Prior Publication Data

US 2022/0247109 A1 Aug. 4, 2022

(30) Foreign Application Priority Data

Jun. 12, 2019 (JP) ................................ 2019-109703

(51) Int. Cl.
*H01R 13/26* (2006.01)
*H01R 13/514* (2006.01)
*H01R 107/00* (2006.01)

(52) U.S. Cl.
CPC ........... *H01R 13/26* (2013.01); *H01R 13/514* (2013.01); *H01R 2107/00* (2013.01)

(58) Field of Classification Search
CPC ........ H01R 13/02; H01R 13/26; H01R 13/28; H01R 13/514; H01R 13/516; H01R 13/518; H01R 2107/00
(Continued)

(56) References Cited

U.S. PATENT DOCUMENTS 2,959,766 A 11/1960 Jacobsen
4,597,622 A 7/1986 Coe
(Continued)

FOREIGN PATENT DOCUMENTS

DE 202016104726 U1 8/2017
JP 15-000085 Y1 1/1940
(Continued)

OTHER PUBLICATIONS

Jul. 28, 2020 International Search Report issued in International Patent Application No. PCT/JP2020/020577.

*Primary Examiner* — Khiem M Nguyen
(74) *Attorney, Agent, or Firm* — Oliff PLC

(57) ABSTRACT

A female terminal includes a terminal body and a slider displaced relative to the terminal body. The terminal body includes a connecting tab deformable in a pressing direction crossing an inserting direction in which an electric wire is inserted and contactable with the electric wire. The slider is
(Continued)

slidable between separated and overlapping positions. The slider includes a narrow portion that protrudes inward and has a less inner dimension in the pressing direction, and a wide portion in front of the narrow portion with respect to the inserting direction and has a greater inner dimension in the pressing direction than the narrow portion. The connecting tab contacts the electric wire when the narrow portion overlaps the connecting tab at the overlapping position. The slider includes a sloped guide surface that is angled at in front of the wide portion to spread further than the wide portion toward the front.

6 Claims, 23 Drawing Sheets

(58) Field of Classification Search
USPC .......................................................... 439/660
See application file for complete search history.

(56) References Cited

U.S. PATENT DOCUMENTS

| | | | | |
|---|---|---|---|---|
| 5,489,225 | A | 2/1996 | Julian | |
| 7,306,495 | B2 | 12/2007 | Hashimoto et al. | |
| 2005/0026515 | A1 | 2/2005 | Hashimoto et al. | |
| 2022/0247109 | A1 * | 8/2022 | Hara ...................... | H01R 13/26 |

FOREIGN PATENT DOCUMENTS

| | | | |
|---|---|---|---|
| JP | 2005-050736 | A | 2/2005 |
| JP | 2015-056209 | A | 3/2015 |

* cited by examiner

TERMINAL

TECHNICAL FIELD

The technology disclosed herein relates to a terminal.

BACKGROUND ART

A known terminal wire assembly includes a core wire exposed at an end of an electric wire and a terminal coupled to the core wire. The terminal may include a crimping portion that is crimped on the core wire that is exposed at the end of the electric wire.

To crimp the terminal on the core wire, the following steps may be performed. A sheet metal is pressed into a predefined shape to prepare the terminal. The terminal is placed on a lower die of dies that are relatively movable in the vertical direction. The core wire exposed at the end of the electric wire is placed on the crimping portion of the terminal. The one of the dies or both dies are moved closer to each other. The crimping portion is crimped by a crimping portion of the upper die and a placing portion of the lower die until the crimping portion of the terminal is deformed and crimped on the core wire. Through these steps, the terminal is coupled to the end of the terminal (see Patent Document 1).

RELATED ART DOCUMENT

Patent Document

[Patent Document 1]
Japanese Unexamined Patent Application Publication No. 2005-50736

SUMMARY OF THE INVENTION

Problem to be Solved by the Invention

According to the technology described above, a relatively large equipment including the dies or a jig for crimping the crimping portion of the terminal on the core wire of the electric wire may be required. Therefore, a production cost may be increased by an investment on the equipment.

The technology described herein was made in view of the above circumstances. An object is to provide a technology for coupling a terminal to an electric wire without using a relatively large jig.

Means for Solving the Problem

A terminal according to the present disclosure includes a terminal body and a slider. An electric wire is insertable into the terminal body in a predefined direction. The terminal body includes connecting tabs that are deformable in a direction crossing an inserting direction in which the electric wire is inserted. The connecting tabs include contact surfaces that are contactable with the electric wire. The slider is slidable between a separated position at which the slider is separated from the terminal body and an overlapping position at which the slider overlaps the terminal body from an outer side while the slider contacts the terminal body from a front end of the connecting tabs. The slider includes pressing portions that protrude inward and press the connecting tabs to contact the electric wire. The slider includes a narrow portion and a wide portion. The narrow portion is in an area in which the pressing portions are provided. The narrow portion as a less inner dimension in a pressing direction in which the pressing portions press the electric wire. The wide portion is in front of the pressing portions with respect to the inserting direction. The wide portion has a greater inner diameter in the pressing direction than the narrow portion. The pressing portions press the connecting tabs when the narrow portion is at the overlapping position and overlaps the connecting tabs from the outer side. The slider includes a sloped guide surface that is angled at an edge of a wall that defines the wide portion to spread further than the wide portion with respect to the pressing direction toward a front with respect to the inserting direction.

Advantageous Effects of Invention

According to the present disclosure, the terminal is coupled to the electric wire without a relatively large jig. Further, attachment of the slider to the terminal body can be stably performed during the attachment of the slider to the terminal body in advance.

MODES FOR CARRYING OUT THE INVENTION

Brief Description of Embodiments

Figure 1:
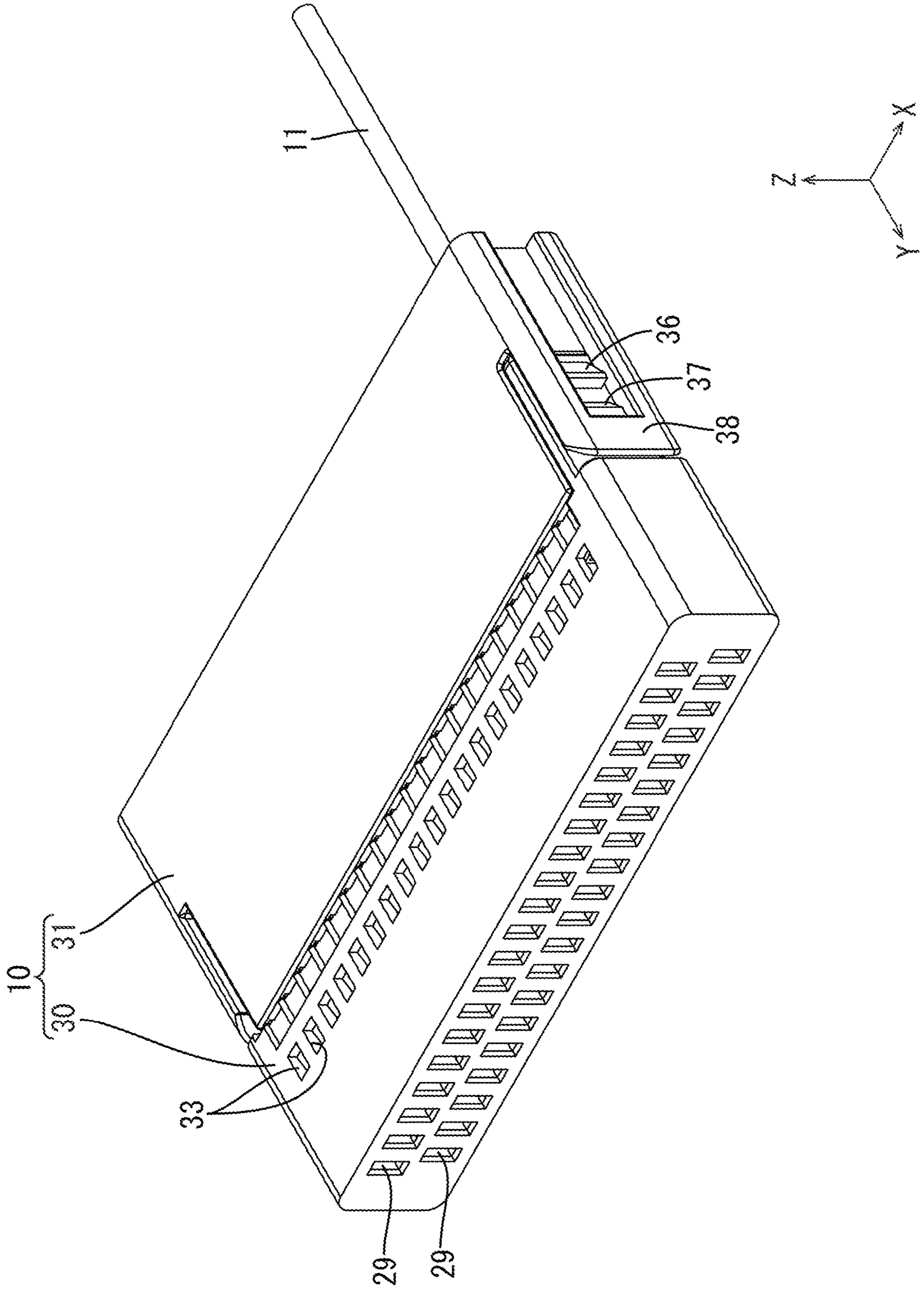
FIG. 1 is a perspective view of a connector according to an embodiment.

First, embodiments of the technology described herein will be listed and described.

(1) A terminal according to the present disclosure includes a terminal body and a slider. An electric wire is insertable into the terminal body in a predefined direction. The terminal body includes connecting tabs that are deformable in a direction crossing an inserting direction in which the electric wire is inserted. The connecting tabs include contact surfaces that are contactable with the electric wire. The slider is slidable between a separated position at which the slider is separated from the terminal body and an overlapping position at which the slider overlaps the terminal body from an outer side while the slider contacts the terminal body from a front end of the connecting tabs. The slider includes pressing portions that protrude inward and press the connecting tabs to contact the electric wire. The slider includes a narrow portion and a wide portion. The narrow portion is in an area in which the pressing portions are provided. The narrow portion as a less inner dimension in a pressing direction in which the pressing portions press the electric wire. The wide portion is in front of the pressing portions with respect to the inserting direction. The wide portion has a greater inner diameter in the pressing direction than the narrow portion. The pressing portions press the connecting tabs when the narrow portion is at the overlapping position and overlaps the connecting tabs from the outer side. The slider includes a sloped guide surface that is angled at an edge of a wall that defines the wide portion to spread further than the wide portion with respect to the pressing direction toward a front with respect to the inserting direction.

According to the configuration, the connecting tabs press the electric wire by moving the slider in the inserting direction. The connecting tabs are electrically connected to the electric wire. The electric wire is electrically connected to the terminal without a relatively large jig. Further, the sloped guide surface guides the slider during attachment of the slider to the terminal body in advance. Therefore, the attachment of the slider to the terminal body can be stably performed.

(2) The contact surfaces of the connecting tabs may be opposite to each other. At least one of the connecting tabs may be slide on the sloped guide surface and guided into the slider.

According to the configuration, at least one of the connecting tabs is slid on the sloped guide surface and guided into the slider having the tubular shape.

(3) One of the terminal body and the sider or another one of the terminal body and the slider may include a first position holding mechanism and a second position holding mechanism. The first position holding mechanism may hold the slider at a first position at which the wide portion overlaps the terminal body from the outer side and the narrow portion does not overlap the connecting tabs from the outer side. The second position holding mechanism may hold the slider at a second position at which the narrow portion overlaps the connecting tabs from the outer side and the pressing portions press the connecting tabs to contact the electric wire.

(4) The slider may include a covering section that covers the sloped guide surface.

According to the configuration, the sloped guide surface is covered with the covering section and separated from the surroundings. Even if the slider is handled alone, the sloped guide surface that is exposed is less likely to be damaged because the sloped guide surface is less likely to touch other components.

(5) The slider may include a jig contact section that receives an external jig to move the slider in the inserting direction.

According to the configuration, the slider is movable from outside using the jig.

(6) The jig contact section may function as a covering section that covers the sloped guide surface.

Because the jig contact section may function as the covering section, the terminal can be reduced in size in comparison to a configuration in which the jig contact section and the covering sections are separately provided.

(7) The slider may include a sloped guide surface at an end of the slider on an opposite side from the wide portion. An amount of projection of the sloped guide surface may increase toward the pressing portion so that the front end of the electric wire that is inserted into the terminal body is guided and placed in a predefined posture.

According to the configuration, even if the front end of the electric wire is in a posture different from the predefined posture during the insertion, the front end of the electric wire is properly guided to the proper position.

(8) The connecting tabs may include a holding protrusion to hold the electric wire bent with respect to the inserting direction at a point different from the contact surfaces while the connecting tabs are deformed by the pressing portions to contact the electric wire.

According to the configuration, the electric wire is held with the holding protrusion. Even if the electric wire is pulled, the holding protrusion receives a force to pull the electric wire and thus a strength to hold the electric wire increases.

(9) Serrations may be formed in the contact surfaces to dig into a surface of the electric wire while the connecting tabs press the electric wire.

With the serrations digging into the surface of the electric wire, the strength to hold the electric wire by the terminal increases. Further, an insulating film that may be formed on the surface of the electric wire may be ripped by the serrations. Therefore, an electrical resistance between the terminal and the electric wire can be reduced.

(10) The serrations may include grooves that extend in a direction perpendicular to the inserting direction. The serrations may be arranged at intervals in the inserting direction.

According to the configuration, the electric wire is held at multiple points with respect to the inserting direction with the serrations. Therefore, the strength to hold the electric wire by the terminal increases. Further, the electric wire is electrically connected to the terminal at multiple points with respect to the inserting direction with the serrations. Therefore, the electrical resistance between the terminal and the electric wire can be reduced.

(11) A wire guide recess may be formed in the contact surface. The wire guide recess may extend in the inserting direction.

The electric wire is easily disposed in the contact surface by placing the electric wire in the wire guide recess.

(12) The terminal body may include a terminal window through which the end of the electric wire at a predefined position is detectable when the electric wire is at the connecting tabs.

According to the configuration, the end of the electric wire can be detected through the terminal window. Whether the electric wire is coupled to the terminal is easily inspected.

(13) A terminal wire assembly according to the present disclosure includes the terminal according to any one of (1) to (13) described above and an electric wire coupled to the terminal.

(14) The connector according to the present disclosure includes a connector housing and a rear holder. The connector housing includes cavities in which terminals are held. The rear holder is attached to a rear portion of the connector housing in an inserting direction in which the terminals are inserted into the cavities. The rear holder includes insertion holes that communicate with the cavities.

According to the configuration, the terminals are held in the connector housing with the terminals while removal of the terminals from the connector housing is restricted by the rear holder.

(15) The rear holder may be removable in the inserting direction. The rear holder may include slider pushing portions that contact the sliders from the rear with respect to the inserting direction and push the slider forward with respect to the inserting direction to move the sliders from the first position to the second position when the rear holder is moved from the rear to the front with respect to the inserting direction.

According to the configuration, the sliders can be pushed by the slider pushing portions of the rear holder when the rear holder is moved. The electric wires are electrically connected to the terminals concurrently with the movement of the rear holder.

(16) The terminal bodies may include terminal windows through which ends of the electric wires at predefined positions can be detectable when the electric wires are at the connecting tabs. The connector housing may include connector windows through which the terminal windows communicate with the outside.

According to the configuration, whether the ends of the electric wires are at the predefined positions can be inspected through the terminal windows via the connector windows.

DETAILED DESCRIPTION OF EMBODIMENTS

Embodiments of the technology described herein will be described. The present invention is not limited to the embodiments. Modifications within technical scope of the claimed invention and equivalents of the technical scope of the claimed invention are considered to be within the technical scope of the present invention.

An embodiment of the technology described herein will be described with reference to FIGS. 1 to 26. A connector 10 according to this embodiment holds a female terminal 12 (an example of a terminal) coupled to an end of an electric wire 11. A terminal wire assembly 60 according to this embodiment includes the female terminal 12 and the electric wire 11 to which the female terminal 12 is coupled. In the following description, it is considered that an Z arrow, a Y arrow, and an X arrow in the drawing point the upper side the front side, and the left side, respectively. Regarding components having the same configuration, some of the components may be indicated by reference signs and others may not be indicated by the reference signs.

(Electric Wire 11)

Figure 2:
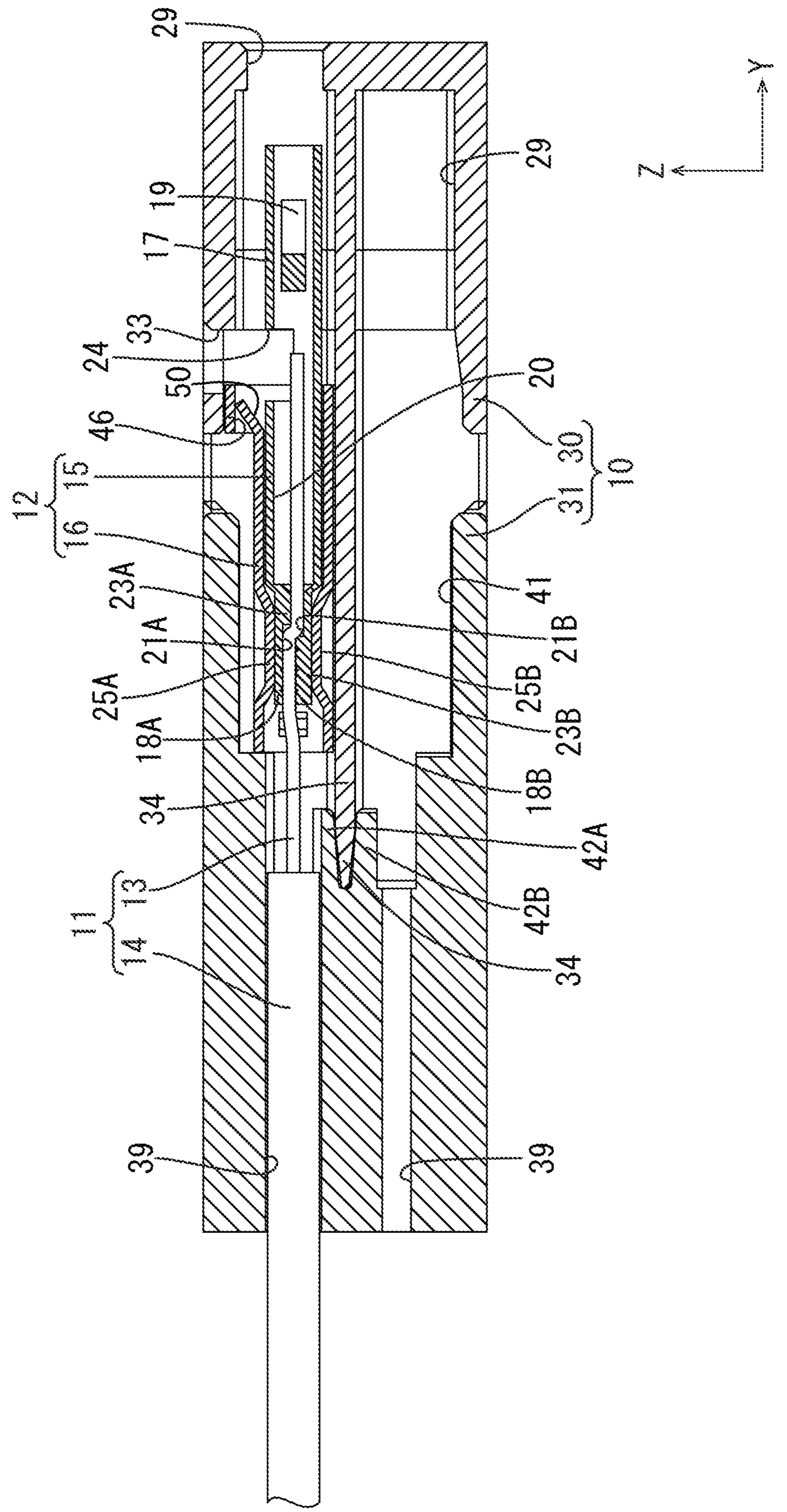
FIG. 2 is a cross-sectional view of the connector.

As illustrated in FIG. 2, the electric wire 11 includes a core wire 13 and an insulating sheath 14 that covers an outer surface of the core wire 13. The insulating sheath 14 is made of synthetic resin having insulating properties. At an end of the electric wire 11, the insulating sheath 14 is ripped and a section of the core wire 13 is exposed. The core wire 13 in this embodiment is a single core wire including only one metal wire. Alternatively, a twisted wire including multiple metal fine wires that are twisted together may be used for the core wire 13. The metal of which the metal wire is made may be selected from copper, copper alloy, aluminum, aluminum alloy, and any other kinds of meatal where appropriate. The core wire 13 in this embodiment may be made of copper or copper alloy.

(Terminal Body 15)

Figure 3:
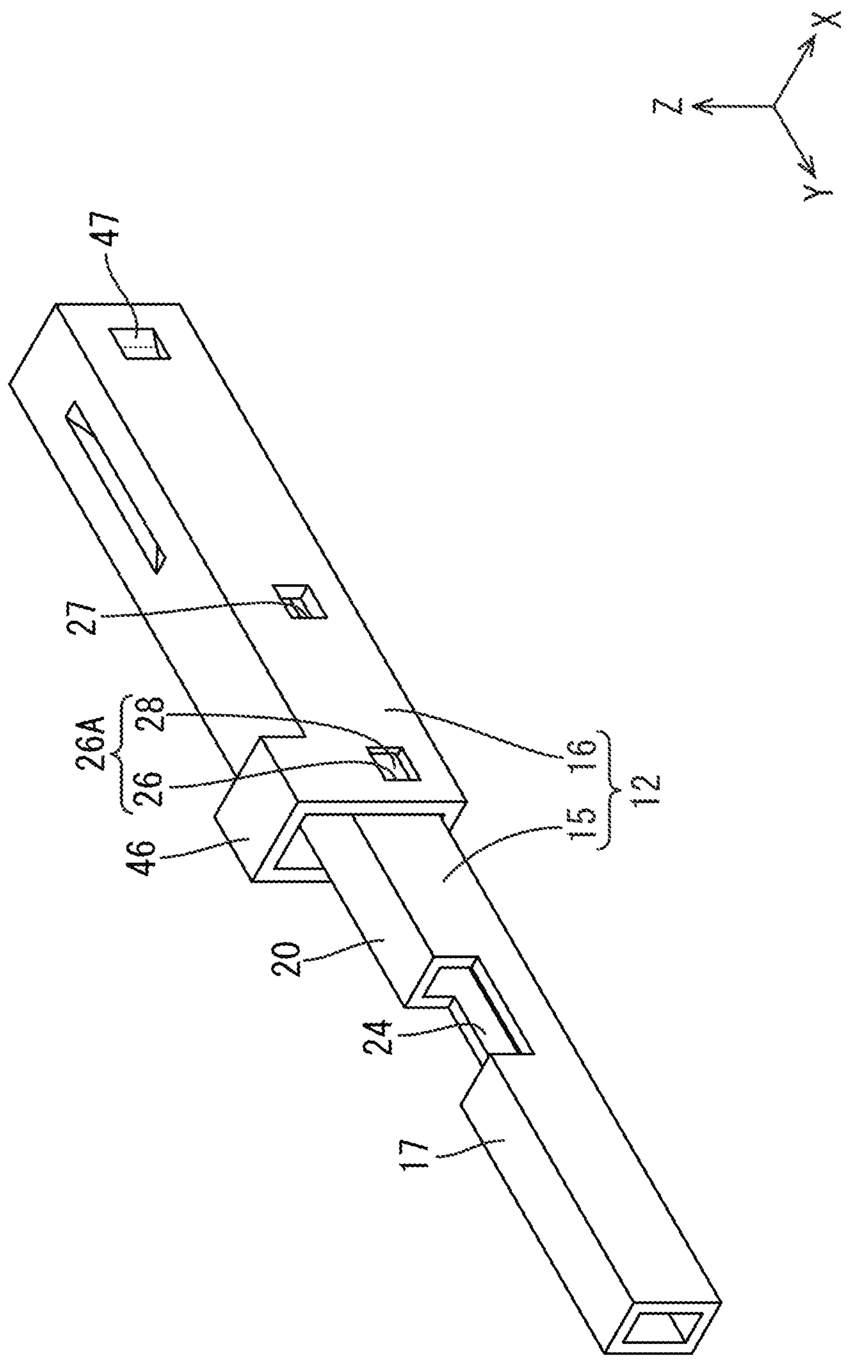
FIG. 3 is a perspective view of a female terminal illustrating a terminal body and a slider at a first condition.
Figure 4:
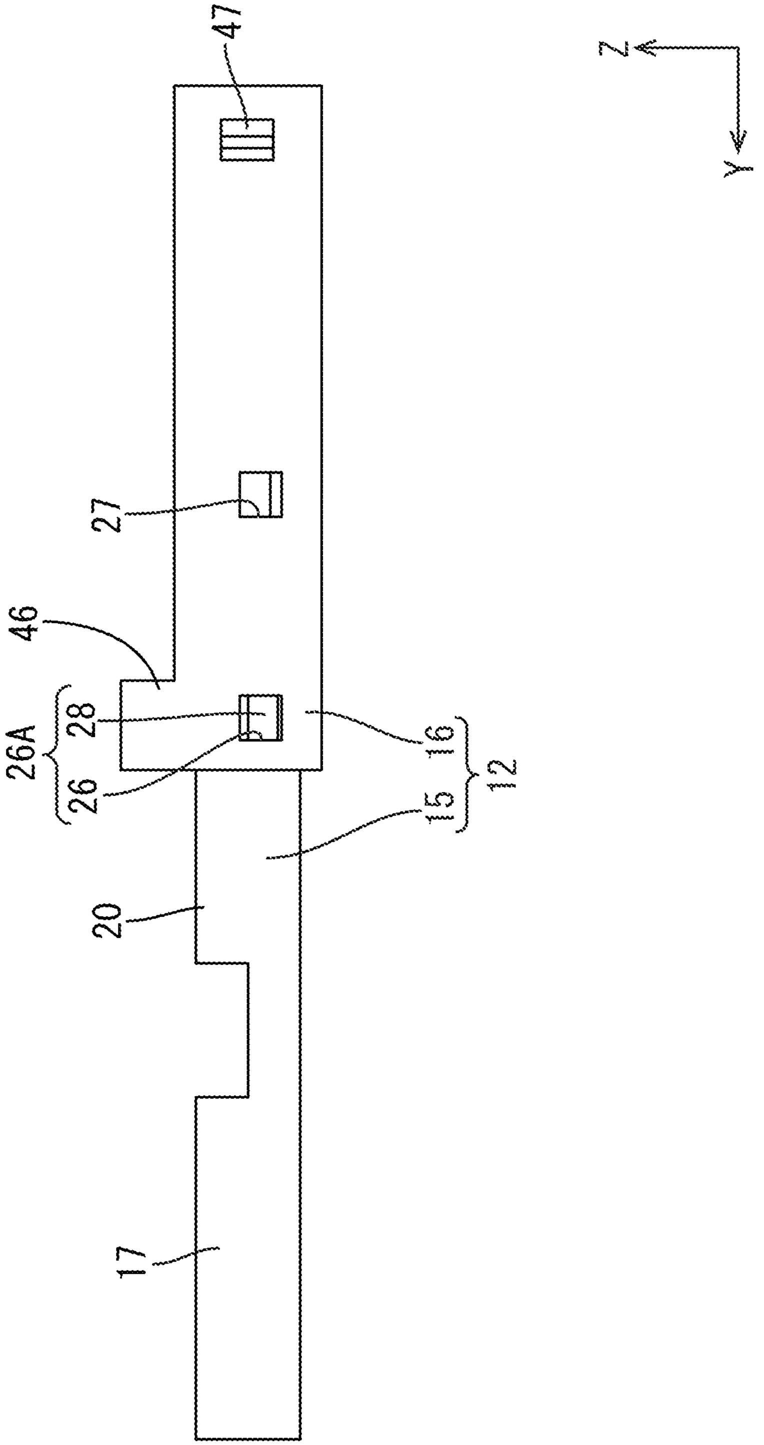
FIG. 4 is a side view of the female terminal illustrating the terminal body and the slider at the first position.

As illustrated in FIGS. 2 to 4, the female terminal 12 includes a terminal body 15 and a slider 16. The terminal body 15 is made of metal. The slider 16 is slidable relative to the terminal body 15. The terminal body 15 and the slider 16 in this embodiment are prepared by pressing. Sheet metal is sheared and bent into predetermined shapes to prepare the terminal body 15 and the slider 16. The metal of which the terminal body 15 and the slider 16 are made may be selected from aluminum, aluminum alloy, stainless steel, and other kinds of metal where appropriate. The terminal body 15 in this embodiment may be made of, but not limited to, copper or copper alloy. The terminal body 15 may be plated. The plating metal may be selected from tin, nickel, silver, and any other kinds of metal where appropriate. The terminal body 15 according to this embodiment is tin-plated. The terminal body 15 and the slider 16 may be formed into the predetermined shapes by metal welding or cutting rather than pressing. The slider 16 may be made of resin rather than metal.

Figure 8:
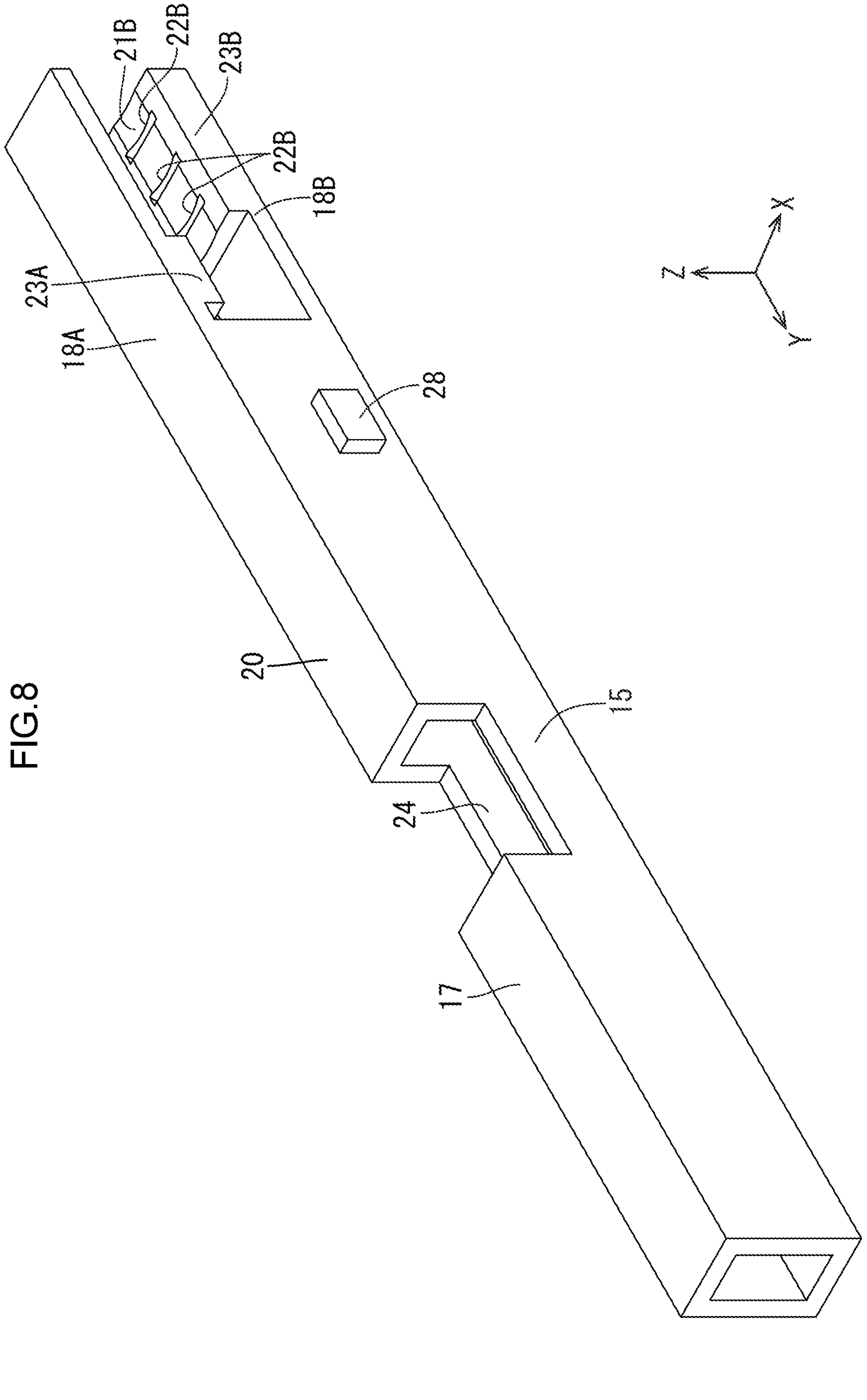
FIG. 8 is a perspective view of the terminal body.
Figure 9:
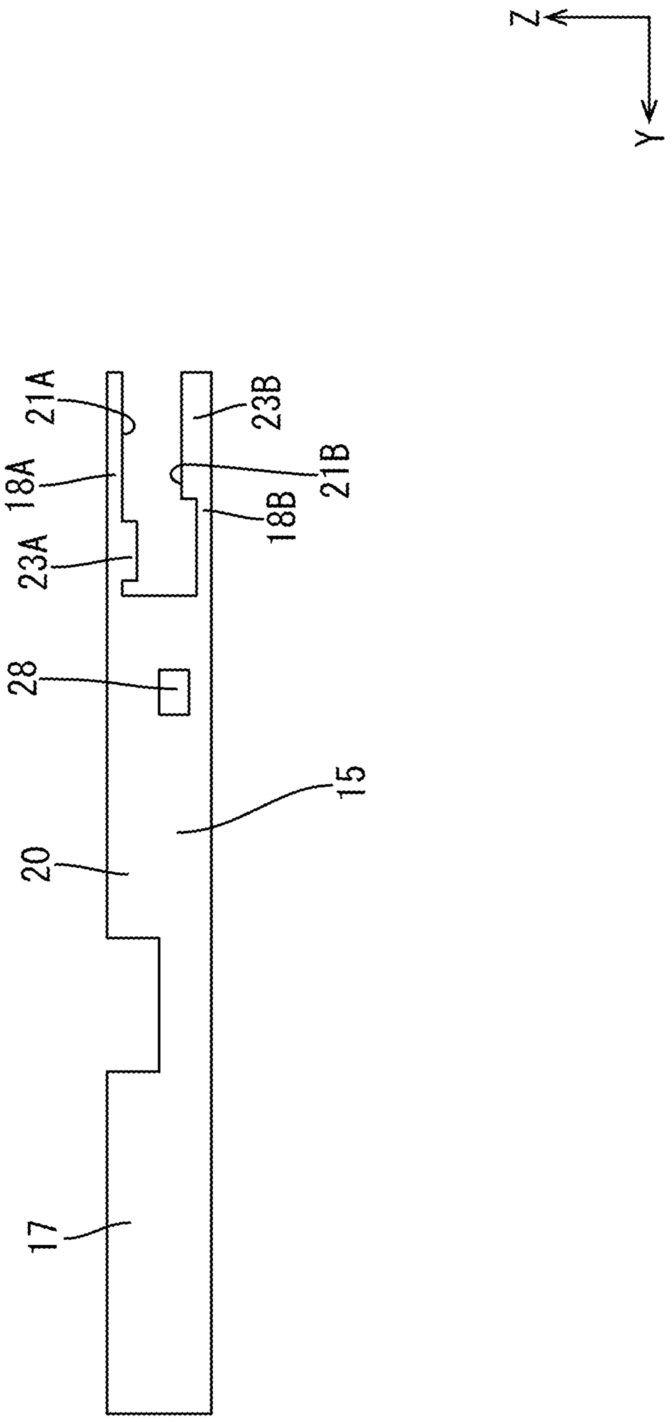
FIG. 9 is a side view of the terminal body.

As illustrated in FIGS. 8 and 9, the terminal body includes a tubular connecting portion 17, an upper connecting tab 18A, and a lower connecting tab 18B. A mating male terminal (not illustrated) is inserted into the tubular connecting portion 17. The upper connecting tab 18A and the lower connecting tab 18B extend rearward from the tubular connecting portion 17. The tubular connecting portion 17 has a rectangular tubular shape and extends in the front-rear direction. The tubular connecting portion 17 has an opening through which the mating male terminal is inserted.

As illustrated in FIG. 2, an elastic connecting tab 19 projects forward from the rear section of the tubular connecting portion 17 inside the tubular connecting portion 17. The male terminal inserted in the tubular connecting portion 17 contacts the elastic connecting tab 19.

A base portion 20 is behind the tubular connecting portion 17. The base portion 20 has a rectangular tubular shape. The upper connecting tab 18A (an example of a connecting tab) projects rearward from a rear end portion of an upper wall of the base portion 20. The lower connecting tab 18B projects rearward from a rear end portion of a lower wall of the base portion 20. The upper connecting tab 18A and the lower connecting tab 18B have elongated shapes extending in the front-rear direction. The electric wire 11 can be inserted into the base portion 20 through a gap between the upper connecting tab 18A and the lower connecting tab 18B from the front end to the rear end, that is, the Y direction (an inserting direction in which the electric wire is inserted).

Lengths of the upper connecting tab 18A and the lower connecting tab 18B measuring in the front-rear direction are about equal to each other.

Figure 10:
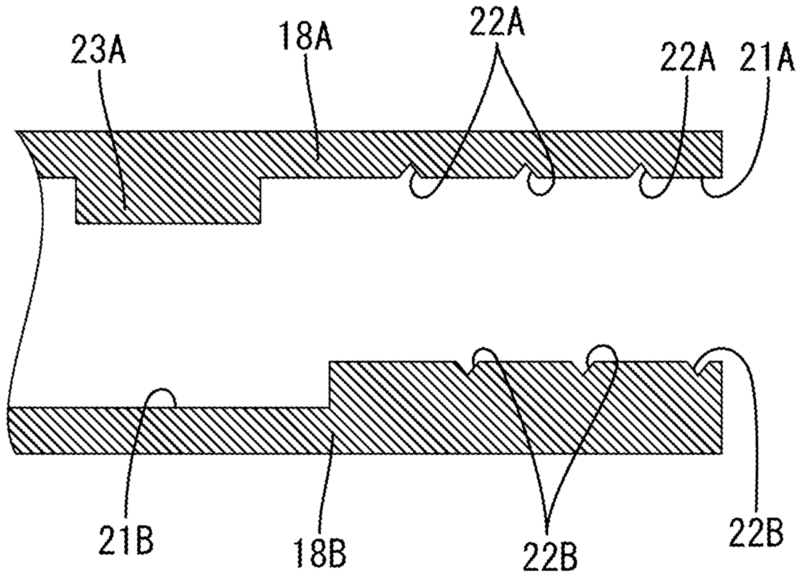
FIG. 10 is a magnified partial cross-sectional view illustrating serrations.

The upper connecting tab 18A includes a tip that is deformable in the vertical direction with a rear end of the base portion 20 as a fulcrum. A lower surface of the upper connecting tab 18A is defined as a contact surface 21A that contacts the core wire 13. As illustrated in FIG. 10, the contact surface 21A includes multiple serrations 22A that include grooves extending in a direction perpendicular to the inserting direction, that is, the right-left direction. The serrations 22A are separated from each other in the front-rear direction and parallel to each other. An upper holding protrusion 23A protrudes downward from the contact surface 21A of the upper connecting tab 18A. A lower surface of the upper holding protrusion 23A may include serrations 22A.

The lower connecting tab 18B includes a tip that is deformable in the vertical direction with a rear end of the base portion 20 as a fulcrum. An upper surface of the lower connecting tab 18B is defined as a contact surface 21B that contacts the core wire 13. The contact surface 21B includes multiple serrations 22B that include grooves separated from each other in the front-rear direction and parallel to each other similar to the contact surface 21A of the upper contacting tap 18A. The serrations 22B are displaced from the serrations 22A in the front-rear direction so that the serrations 22B do not overlap the serrations 22A (see FIG. 10).

A lower holding protrusion 23B protrudes upward from the contact surface 21B of the lower connecting tab 18B. The lower holding protrusion 23B is displaced from the upper holding protrusion 23A in the front-rear direction. In this embodiment, the upper holding protrusion 23A is closer to the front and the lower holding protrusion 23B is closer to the rear. As illustrated in FIG. 10, the lower holding protrusion 23B and the upper holding protrusion 23A include steps that are displaced from each other in the front-rear direction. The step of the lower holding protrusion 23B is separated from the step of the upper holding protrusion 23A by a distance slightly greater than a diameter of the core wire 13 of the electric wire 11.

Figure 13:
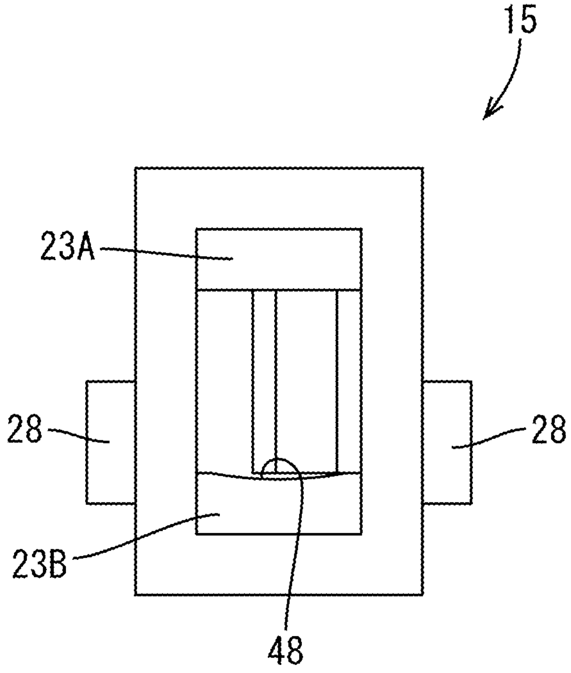
FIG. 13 is a back view of the slider.
Figure 14:
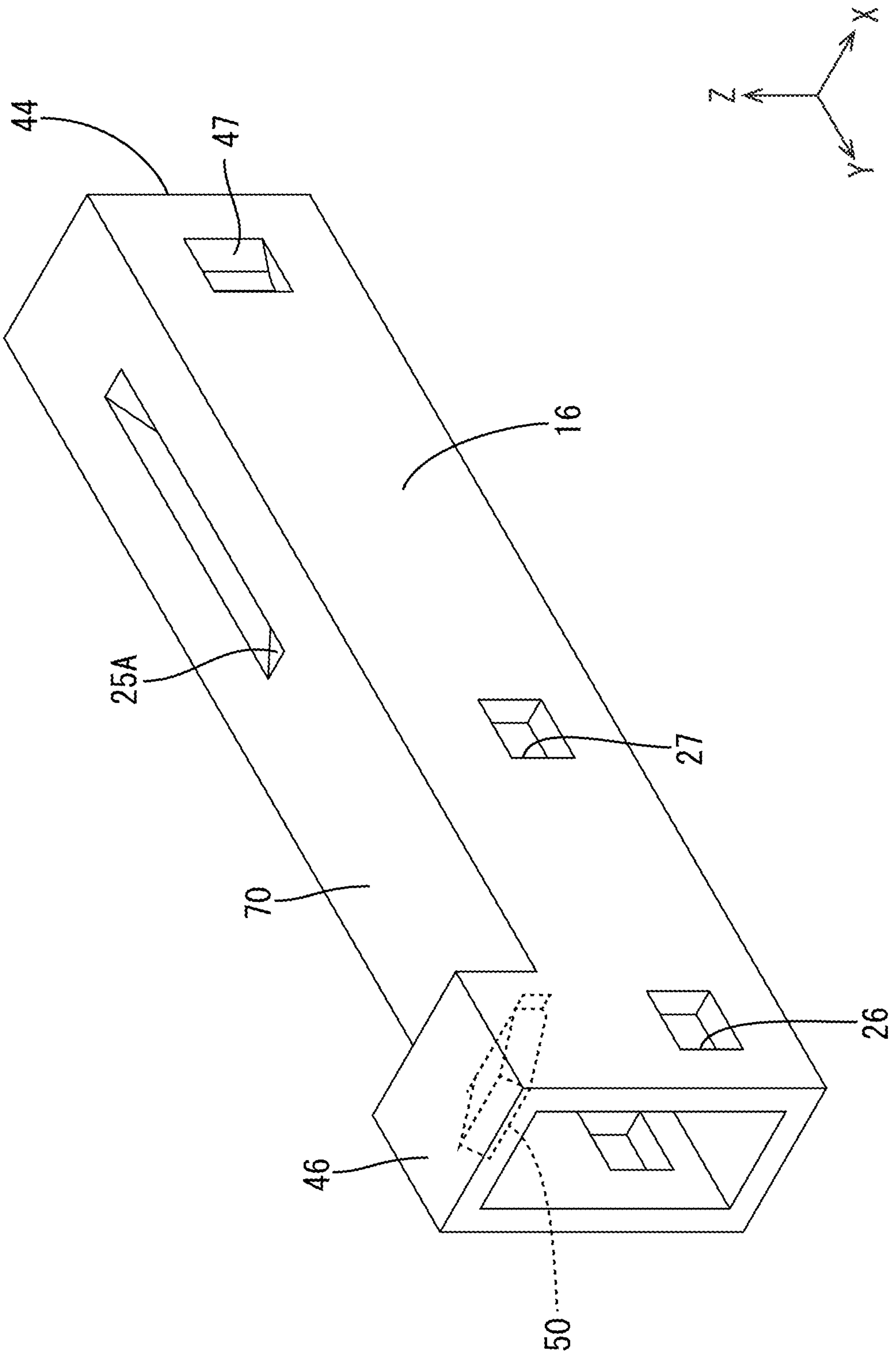
FIG. 14 is a perspective view of the slider.
Figure 15:
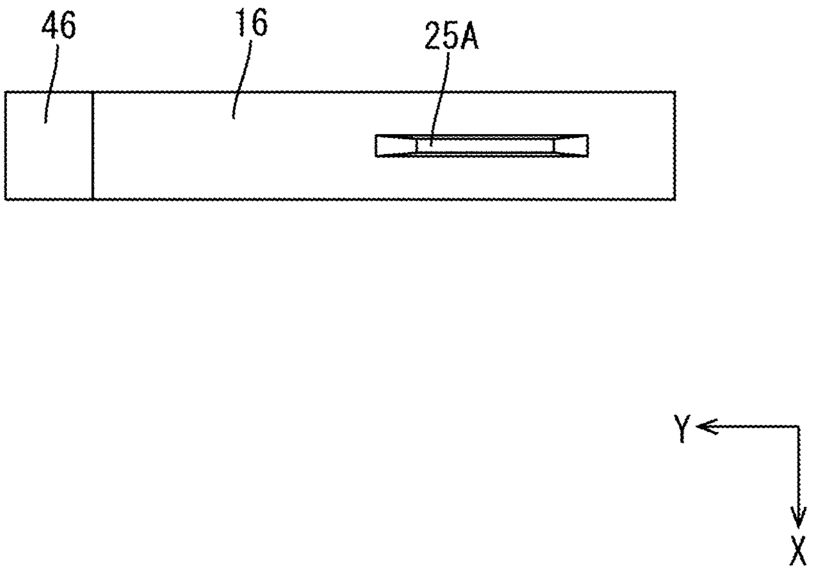
FIG. 15 is a top view of the slider.
Figure 16:
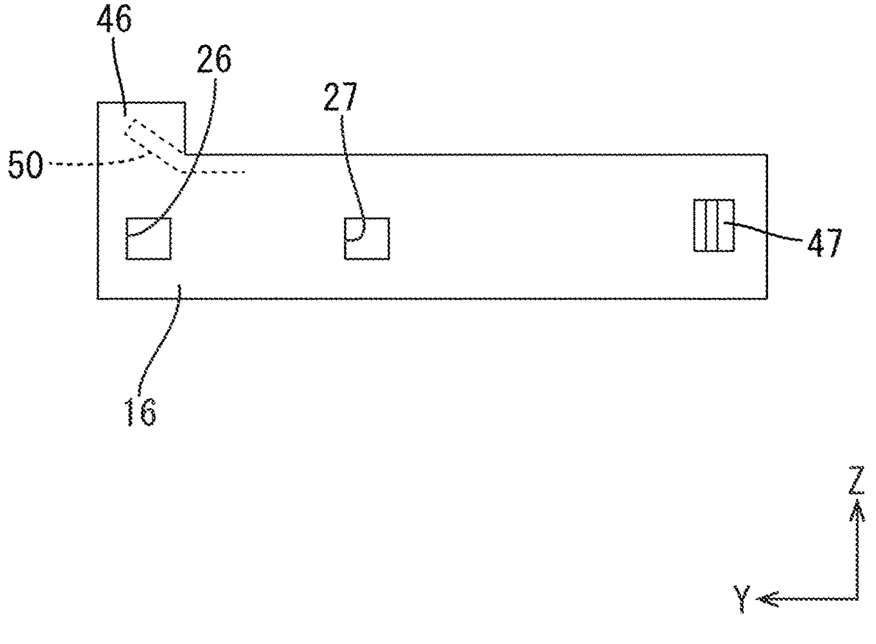
FIG. 16 is a side view of the slider.

As illustrated in FIG. 13, the contact surface 21B of the lower connecting tab 18B includes a section at the middle in the right-left direction are dented to form slopes. The dented section is defined as a wire guide recess 48 that extends in the inserting direction in which the electric wire 11 is inserted.

The serrations 22A in the upper connecting tab 18A and the serrations 22B in the lower connecting tab 18B dig into an oxide film formed on the surface of the core wire 13 and locally strip the oxide film so that the contact surfaces 21A and 21B contact metal surfaces of the core wire 13. With the metal surface contacting the contact surface 21A of the upper connecting tab 18A and the contact surface 21B of the lower connecting tab 18B, the core wire 13 is electrically connected to the terminal body 15.

Figure 11:
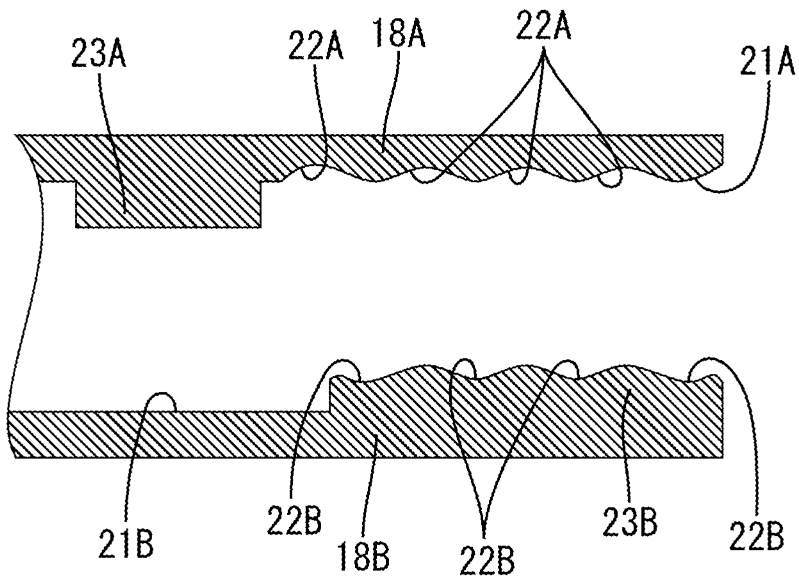
FIG. 11 is a magnified partial cross-sectional view illustrating variations of the serrations.
Figure 12:
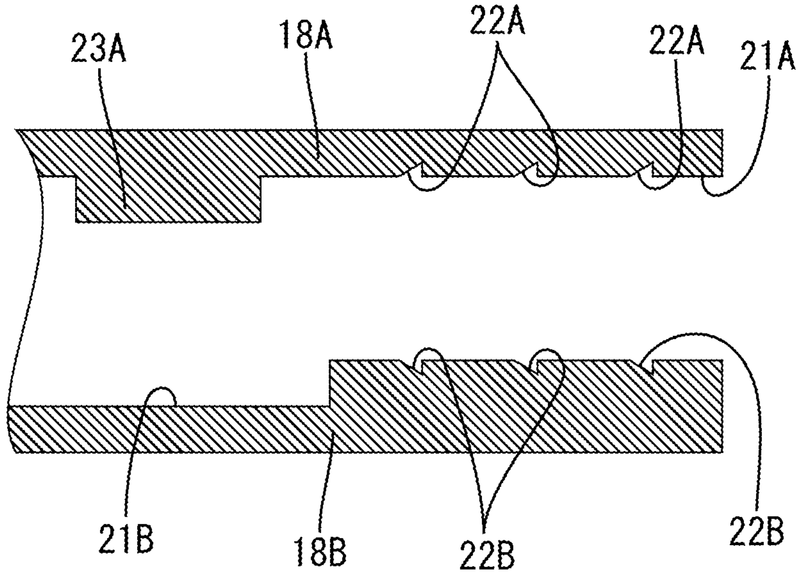
FIG. 12 is a magnified partial cross-sectional view illustrating variations of the serrations.

Shapes of the serrations 22A and the serrations 22B may be selected from shapes illustrated in FIGS. 10 to 12 where appropriate. In this embodiment, the grooves of the serrations 22A and 22B have a V-shaped cross section as illustrated in FIG. 10. The serrations 22A and 22B may have a wavy shape that gently waves in the front-rear direction illustrated in FIG. 11. The grooves of the serrations 22A and 22B may have a triangular cross section as illustrated in FIG. 12. The serrations 22A and 22B in FIG. 12 are defined by rear walls that are vertical and front walls that are angled so that a distance between each rear wall and the corresponding front wall increases toward the rear. With this configuration, the rear walls of the serrations 22A and 22B dig into the surface of the core wire 13 and a strength of the female terminal 12 to hold the electric wire 11 increases.

The serrations 22A and 22B may have shapes other than the shapes described above. The serrations 22A and 22B may include U-shaped grooves. The grooves of the serrations 22A and 22B may have shapes that are defined by bottom walls and side walls that are perpendicular to the bottom walls.

The terminal body 15 includes a terminal window 24 behind the tubular connecting portion 17 and in front of the base portion 20. The terminal window 24 opens upward. The front end of the core wire 13 is detectable from outside through the terminal window 24 when the electric wire 11 is at a predefined position, that is, the electric wire 11 is passed through the gap between the upper connecting tab 18A and the lower connecting tab 18B to get closer to the terminal window 24. Detectable from outside means that the front end is viewable to an inspector or a camera from outside or the front end of the core wire 13 is electrically detectable with a probe (not illustrated) inserted from outside.

(Slider 16)

As illustrated in FIGS. 14 to 18, the slider 16 has a rectangular tube shape that extends in the front-rear direction. The slider 16 may be prepared by a known method such as cutting, casting, and pressing. The metal of which the slider 16 is made may be selected from any kinds of metal including copper, copper alloy, aluminum, aluminum alloy, and stainless steel where appropriate. The slider 16 in this embodiment is prepared by pressing stainless sheet metal. Surfaces of the slider 16 may be plated. Metal used for plating may be selected from any kinds of metal including tin, nickel, and silver where appropriate.

A cross section of an inner portion of the slider 16 along a plane perpendicular to the Y direction is equal to or slightly greater than the cross section of an outer portion of the terminal body 15 in which the upper connecting tab 18A and the lower connecting tab 18B are provided. The slider 16 is in the rectangular tubular shape to surround a pair of the upper connecting tab 18A and the lower connecting tab 18B.

The slider 16 includes an upper pressing portion 25A that protrudes downward from a rear section of an upper wall 70. The slider 16 includes a lower pressing portion 25B that protrudes upward from a section of the lower wall opposite the upper pressing portion 25A. A portion of the slider 16 including the upper pressing portion 25A and the lower pressing portion 25B are defined as a narrow portion 16B. The narrow portion 16B has an internal dimension measuring in the top-bottom direction smaller than a dimension of a portion of the slider 16 in front of the narrow portion 16B. The portion in front of the portion including the upper pressing portion 25A and the lower pressing portion 25B has a cross section equal to or slightly greater than the cross section of the portion of the terminal body 15 including the upper connecting tab 18A and the lower connecting tab 18B as described above. Therefore, the portion is set to a position at which the portion covers the rear end of the terminal body 15 from outside, that is, the portion is fitted on the rear end of the terminal body 15. At the position, the upper pressing portion 25A and the lower pressing portion 25B do not contact the upper connecting tab 18A and the lower connecting tab 18B and thus the upper connecting tab 18A and the lower connecting tab 18B are not deformed inward (see FIG. 21). The portion of the slider 16 in front of the upper pressing portion 25A and the lower pressing portion 25B is defined as a wide portion 16A. At the overlapping position at which the wide portion 16A is fitted only on the rear portion of the terminal body 15, the upper connecting tab 18A and the lower connecting tab 18B do not deform. Because a distance between the upper connecting tab 18A and the lower connecting tab 18B is greater than the diameter of the core wire 13 when the upper connecting tab 18A and the lower connecting tab 18B are not deformed, the electric wire 11 can be inserted into the terminal body 15 without difficulty.

A right wall and a left wall of the slider 16 include temporary receiving holes 26 closer to the front edge and permanent receiving holes 27 behind the temporary receiving holes 26. Holding protrusions 28 on the right wall and the left wall of the terminal body 15 can be elastically held by the temporary receiving holes 26 or the permanent receiving holes 27.

When the holding protrusions 28 of the terminal body 15 are held by the temporary receiving holes 26, the upper pressing portion 25A and the lower pressing portion 25B of the slider 16 are separated rearward from the rear edges of the upper connecting tab 18A and the lower connecting tab 18B of the terminal body 15. Therefore, the upper connecting tab 18A and the lower connecting tab 18B do not deform. This position of the slider 16 is referred to as a first position. A holding mechanism including the temporary receiving holes 26 and the holding protrusions 28 to hold the slider 16 at the first position is referred to as a first position holding mechanism 26A (see FIG. 4).

When the slider 16 is pushed forward from the first position, the holding protrusions 28 of the terminal body 15 are removed from the temporary receiving holes 26 of the slider 16 and fitted in the permanent receiving holes 27 on the front side. The upper pressing portion 25A and the lower pressing portion 25B of the slider 16 run on the upper connecting tab 18A and the lower connecting tab 18B of the terminal body 15. The upper connecting tab 18A and the lower connecting tab 18B deform to press the electric wire 11 (see FIG. 2). In this description, a position of the slider 16 described above is referred to as a second position. The permanent receiving holes 27 of the slider 16 and the holding protrusions 28 are referred to as a second position holding mechanism 26B (see FIG. 6).

Figure 17:
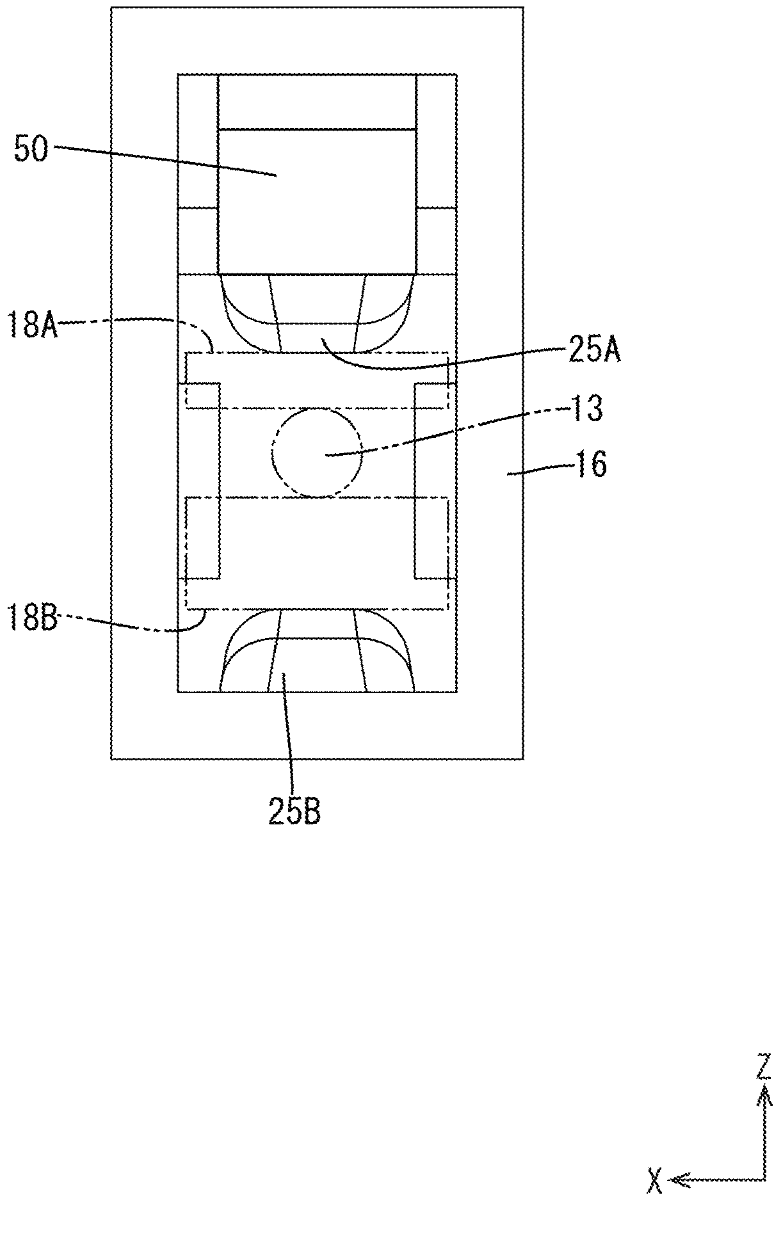
FIG. 17 is a front view of the slider.
Figure 18:
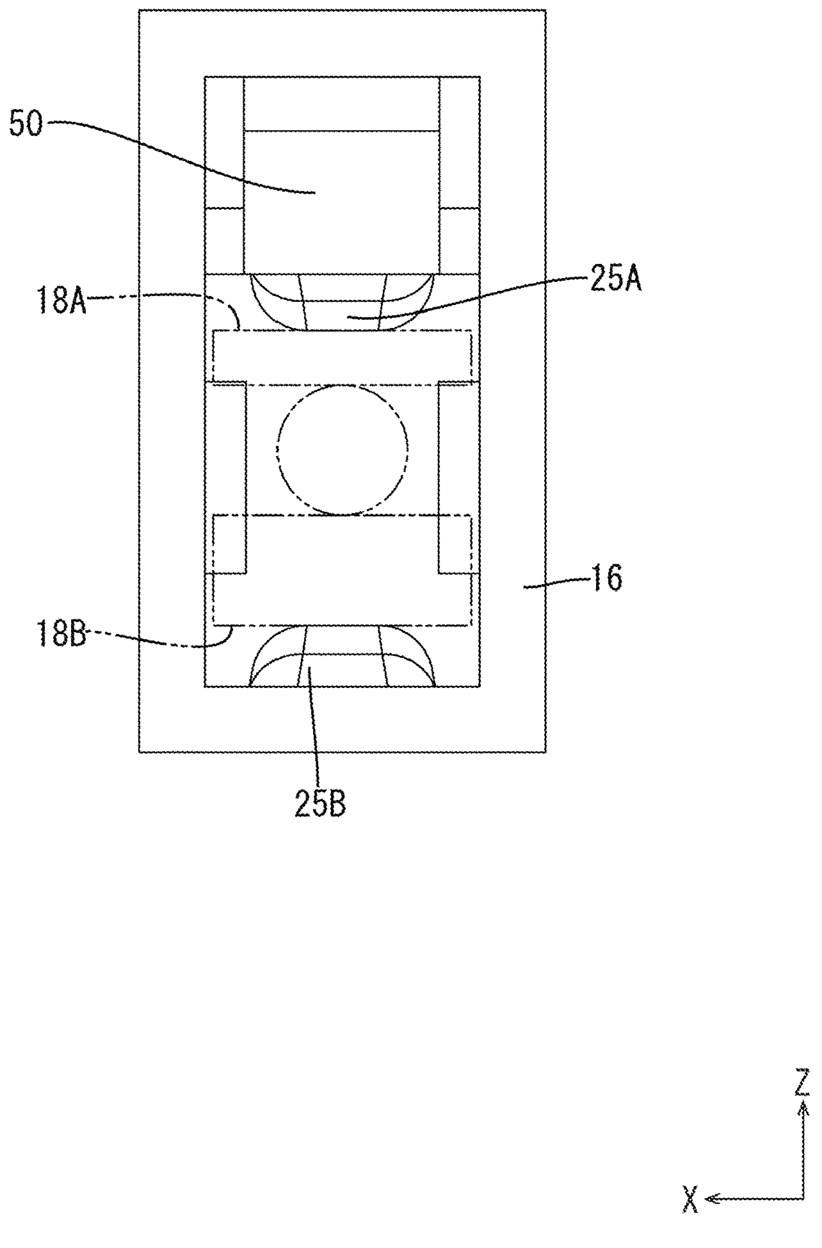
FIG. 18 is a front view of the slider including a contact portion with an altered height.

As illustrated in FIGS. 17 and 18, the height of the upper pressing portion 25A and the height of the lower pressing portion 25B may be altered for an electric wire 11 including a core wire 13 having a different diameter can be coupled to the female terminal 12 even when a terminal body 15 having the same shape is used. For example, as illustrated in FIG. 18, the height of the upper pressing portion 25A and the height of the lower pressing portion 25B are less than the heights of those illustrated in FIG. 17. Although the electric wire 11 illustrated in FIG. 18 includes the core wire 13 having a diameter greater than that of the core wire 13 illustrated in FIG. 17, the electric wire 11 illustrated in FIG. 18 can be coupled to the female terminal 12 using the terminal body 15 having the same shape as the terminal body 15 illustrated in FIG. 17.

When the slider 16 is at the second position relative to the terminal body 15 (FIGS. 2 and 7), the upper holding protrusion 23A on the upper connecting tab 18A presses the core wire 13 from above. The lower connecting tab 18B includes a recess that is recessed to form a step down from the lower holding protrusion 23B in a front section. The recess can receive the upper holding protrusion 23A. With the upper holding protrusion 23A, the core wire 13 of the electric wire 11 is electrically connected to the female terminal 12. The terminal wire assembly 60 and having the configuration described above is obtained.

The front end of the slider 16 includes a jig contact section 46 (an example of a covering section). The jig contact section 46 protrudes upward from the upper wall 70. The jig contact section 46 has a rectangular arch shape. The jig contact section 46 is hollow and in a cover shape. When a jig 45 contacts the jig contact section 46 from the rear and the slider 16 is pushed forward by the jig 45, the slider 16 slides forward (see FIG. 26). The jig 45 has an elongated plate or rod shape. The jig 45 is made of a known material including metal and synthetic resin. The jig 45 is relatively small in comparison to dies or equipment to move the dies. Therefore, an increase in cost related to the jig 45 is suppressed.

The slider 16 includes guide portions 47 that protrude inward from rear sections of the right wall and the left wall of the slider 16. The guide portions 47 are formed such that a distance between the guide portions 47 decreased from the rear toward the front. The core wire 13 are slid on inner surfaces of the guide portions 47 and guided into a middle section of an inner space of the slider 16.

Figure 5:
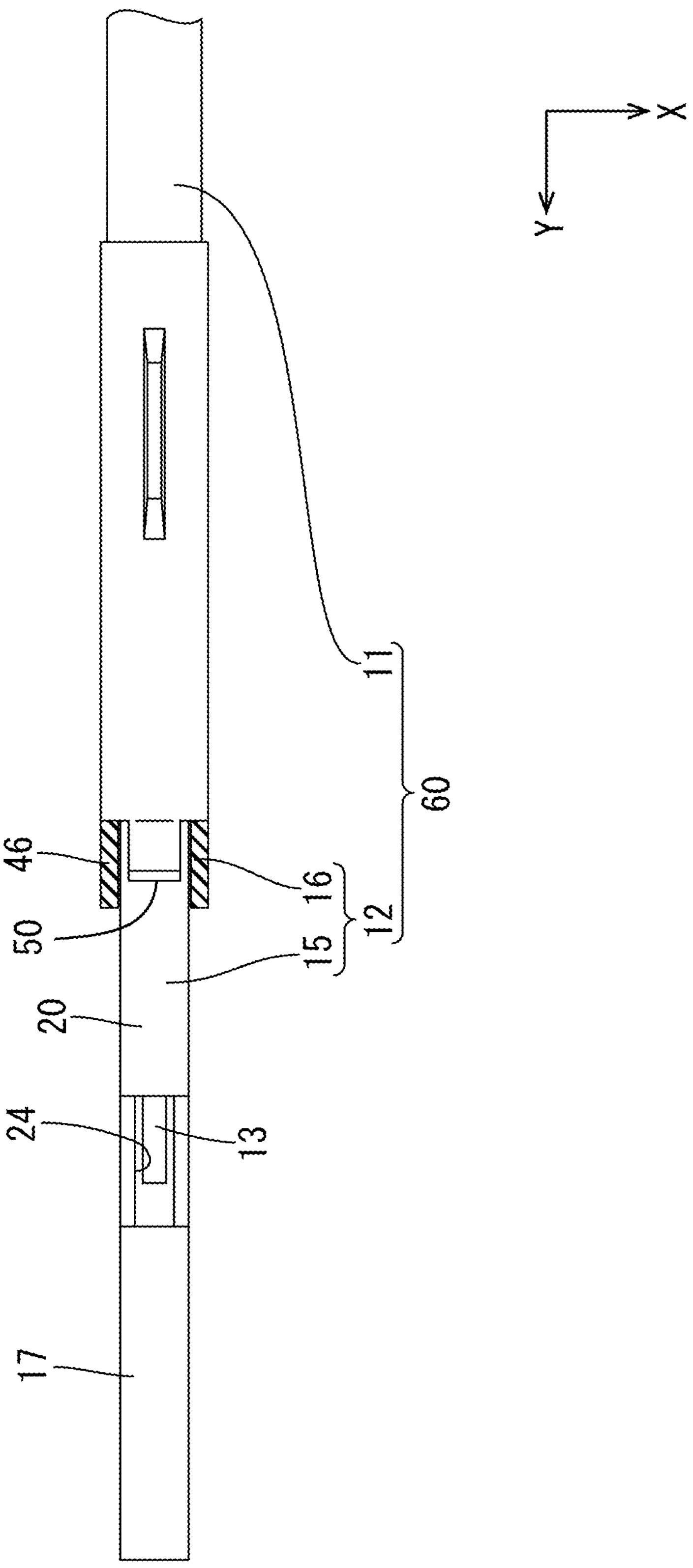
FIG. 5 is a plan view of the female terminal with a partial cross-sectional view illustrating the terminal body and the slider at the first position.
Figure 6:
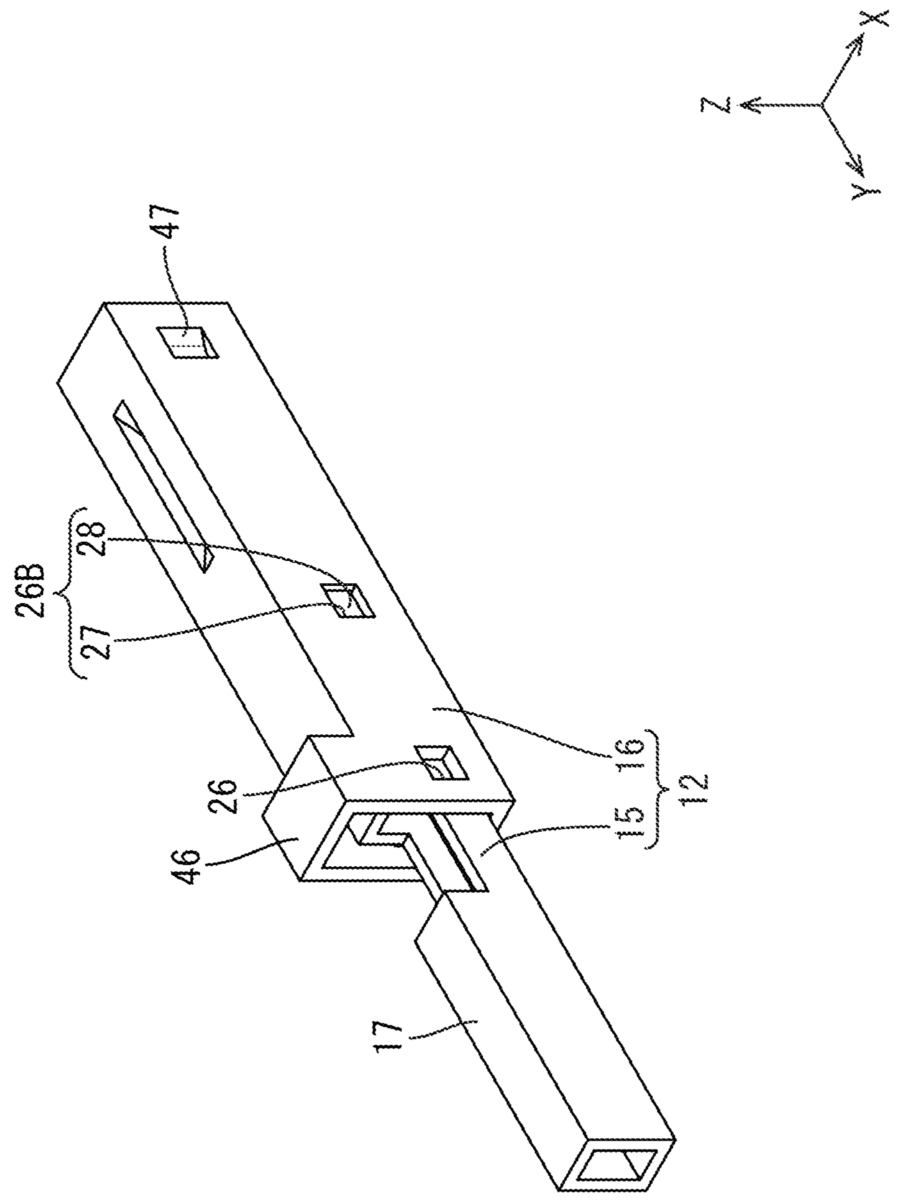
FIG. 6 is a perspective view of the female terminal illustrating the terminal body the slider at the second position.
Figure 7:
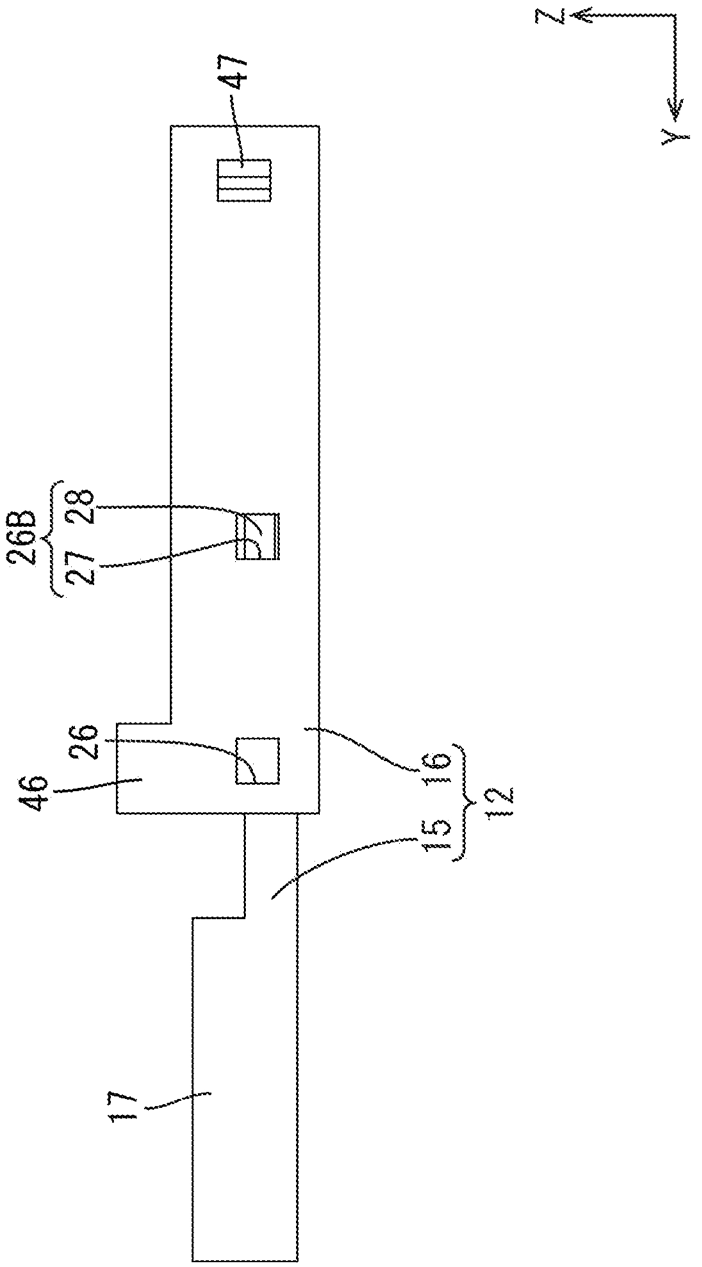
FIG. 7 is a side view of the female terminal illustrating the terminal body and the slider at a second position.
Figure 21:
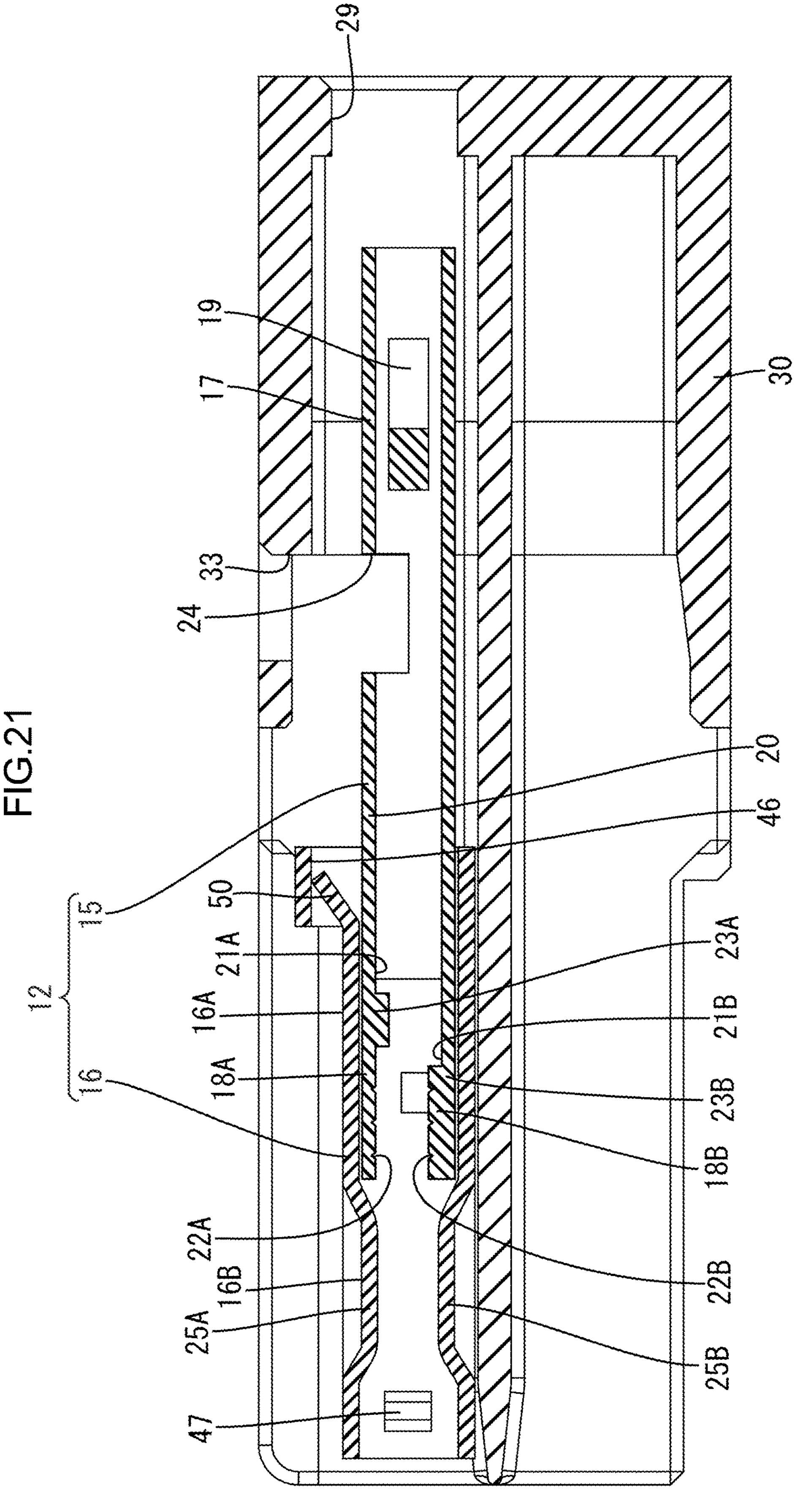
FIG. 21 is a cross-sectional view of the connector housing with the female terminal attached.

As illustrated in FIGS. 5 and 21, the slider 16 includes a sloped guide surface 50 immediately below the jig contact section 46. Namely, the sloped guide surface 50 is covered with the jig contact section 46. The sloped guide surface 50 is sloped such that a front end is the farthest from the upper connecting tab 18A at a position opposite the upper connecting tab 18A of the terminal body 15. Namely, the sloped guide surface 50 is sloped such that the front end is angled upward to form a tongue-like shape. In this embodiment, the sloped guide surface 50 and the sheet of the terminal body 15 are made of the same material and integrally formed. The sloped guide surface 50 is angled upward at the front edge of the upper wall 70 that defines the wide portion 16A toward the front. Namely, the sloped guide surface 50 spreads wider than the wide portion 16A in the top-bottom direction in which the core wire 13 of the electric wire 11 is pressed by the upper pressing portion 25A and the lower pressing portion 25B. A length of the sloped guide surface 50 is defined such that the sloped guide surface 50 does not project from the jig contact section 46 and thus the hidden by the jig contact section 46. When the slider 16 is handled alone, the sloped guide surface 50 is less likely to be an obstacle to other components.

(Connector 10)

As illustrated in FIG. 1, the connector 10 includes a connector housing 30 and a rear holder 31. The connector housing 30 includes cavities 29 in which female terminals 12 are held. The rear holder 31 is attached to a rear end of the connector hosing 30.

(Connector Housing 30)

Figure 19:
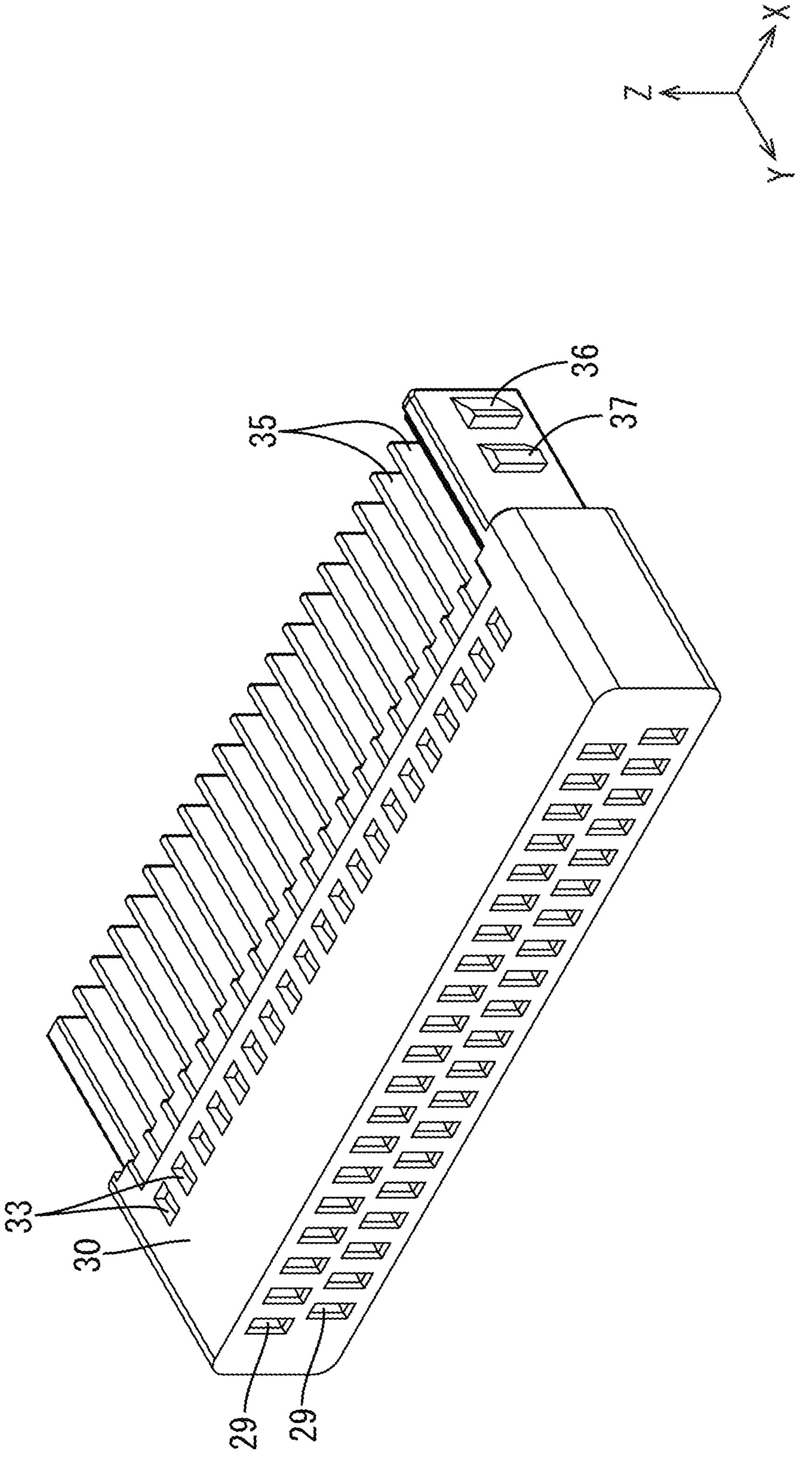
FIG. 19 is a perspective view of a connector housing.
Figure 20:
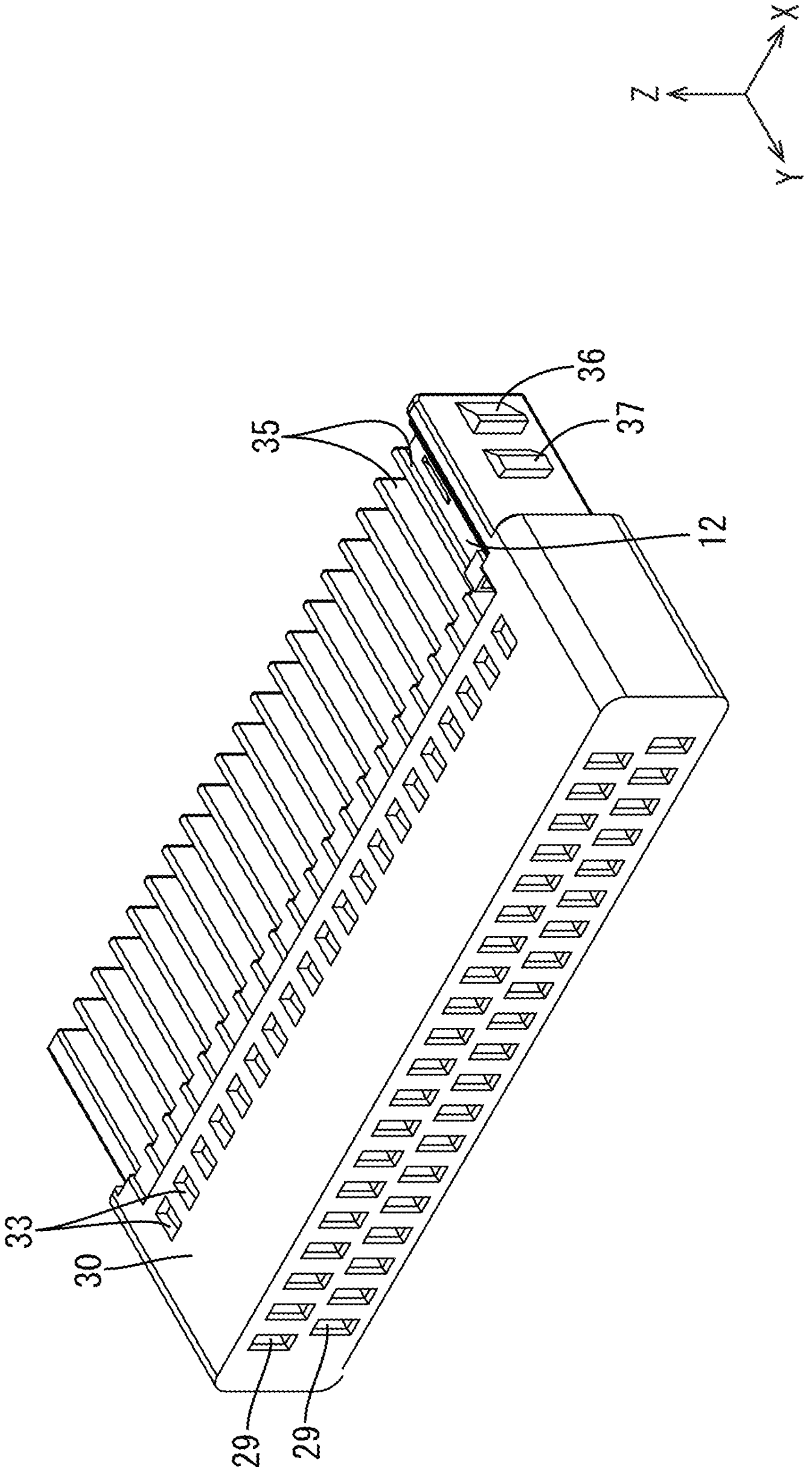
FIG. 20 is a perspective view of the connector housing with the female terminal attached.

As illustrated in FIG. 19, the connector housing has a rectangular block shape that is flat in the top-bottom direction and elongated in the right-left direction. The connector housing 30 is prepared by injecting molten synthetic resin having insulating properties and molding into a shape. The connector housing 30 includes the cavities 29 that extends in the front-rear direction and in which the female terminals 12 are held. The cavities 29 are at intervals in the right-left direction and in double-tier arrangement. The cavities 29 in an upper tier and the cavities 29 in a lower tier are displaced from each other in the top-bottom direction. The number of the cavities 29 and the number of tiers can be altered.

Front ends of the cavities 29 have openings to open forward. Male terminals can be inserted through the openings. Rear ends of the cavities 29 have openings to open rearward. The female terminals 12 can be inserted from the rear through the opening.

As illustrated in FIG. 2, connector windows 33 are provided that are through holes in a wall that defines the cavities 29. The connector windows 33 are at positions opposite terminal windows 24 of the female terminals 12 when the female terminals 12 are held in the cavities 29. The terminal windows 24 are communicated with the outside through the connector windows 33. The terminal windows 24 of the female terminals 12 can be detectable from outside through the connector windows 33. Therefore, the front end of the core wire 13 can be detectable from outside through the connector windows 33 and the terminal windows 24.

The connector housing 30 include a dividing wall 34 that separates the cavities 29 in the upper tier from the cavities 29 in the lower tier. The dividing wall 34 projects rearward from the rear edges of the cavities 29. Partition walls 35 protrude from an upper surface and a lower surface of the dividing wall 34. The partition walls 35 extend in the front-rear direction. Each partition wall 35 electrically isolates each female terminal 12 held in the corresponding cavity 29 from the female terminal 12 adjacent to the female terminal 12 in the right-left direction.

The connector housing 30 includes temporary holding locks 36 that protrude outward from rear sections of a right wall and a left wall of the connector housing 30, respectively. Permanent holding locks 37 protrude outward from sections of the right wall and the left wall more to the front than the temporary holding locks 36.

(Rear Holder 31)

The rear holder 31 has a box shape with an opening in the front side. The rear holder 31 is prepared by injecting molten synthetic resin having insulating properties and molding into a shape. The rear holder 31 is fitted on the rear portion of the connector housing 30. The right wall and the left wall of the rear holder 31 include lock receiving portions 38 to which the temporary holding locks 36 and the permanent holding locks 37 of the connector housing 30 are elastically fitted. Each of the lock receiving portions 38 has a rectangular arch shape.

With the temporary holding locks 36 of the connector housing 30 fitted to the lock receiving portions 38 of the rear holder 31, the rear holder 31 is held at the temporary holding position relative to the connector housing 30. With the permanent holding locks 37 of the connector housing 30 fitted to the lock receiving portions 38 of the rear holder 31, the rear holder 31 is held at the permanent holding position relative to the connector housing 30.

The rear holder 31 includes insertion holes 39 at intervals in the right-left direction and in double-tier arrangement. Electric wires 11 are inserted in the insertion holes 39. The insertion holes 39 are at positions corresponding to the cavities 29 of the connector housing 30. An inner diameter of each insertion hole 39 is equal to or slightly larger than an outer diameter of the insulating sheath 14 of the electric wire 11.

The rear holder 31 includes a hood portion 41 with an opening in the front side. The hood portion 41 is fitted on the connector housing 30. The hood portion 41 includes projecting walls 42A and 42B that project forward from the rear portion of the hood portion 41. The projecting walls 42A and 42B are located at the middle with respect to the top-bottom direction. The projecting walls 42A and 42B are separated from each other in the top-bottom direction. The distance between the projecting walls 42A and 42B in the top-bottom direction is equal to or slightly greater than the thickness of the dividing wall 34 of the connector housing 30.

With the rear holder 31 held at the temporary holding position relative to the connector housing 30, the projecting walls 42A and 42B of the rear holder 31 are more to the rear than the dividing wall 34 of the connector housing 30. With the rear holder 31 held at the permanent holding position relative to the connector housing 30, the dividing wall 34 of the connector housing 30 is fitted in a gap between the projecting walls 42A and 42B of the rear holder 31. At this position, the rear holder 31 is less likely to be displaced in the top-bottom direction relative to the connector housing 30.

Inner walls of the hood portion 41 has a smaller thickness in areas slightly rear than the front edge in comparison to other areas. Namely, the inner walls of the hood portion 41 include steps between areas closer to the front edge and rear areas. The steps are defined as slider pushing portions 43 that contact the rear edge 44 of the slider 16 from the rear when the rear holder 31 is moved from the temporary holding position to the permanent holding position relative to the connector housing 30. When each slider pushing portion 43 contacts the rear edge 44 of the corresponding slider 16 at the first position and pushes the slider 16 forward, the slider 16 is moved to the second position.

First Example of Assembling of the Connector 10

A first example of assembling of the connector 10 according to this embodiment will be described. The assembling of the connector 10 is not limited to that described below.

The terminal body 15 and the slider 16 are prepared by a known method. The slider 16 is attached to the terminal body 15 from the rear with the wide portion 16A on the front. An inner dimension of the wide portion 16A in the top-bottom direction is equal to or slightly greater than a distance between the upper surface of the upper connecting tab 18A and the lower surface of the lower connecting tab 18B of the terminal body 15. Therefore, the terminal body 15 can enter into the wide portion 16A until the front edges of the upper connecting tab 18A and the lower connecting tab 18B contact the front edges of the upper pressing portion 25A and the lower pressing portion 25B (see FIG. 21). When the rear end of the terminal body 15 enters into the slider 16, the front edge of the upper connecting tab 18A may contact the terminal body 15 under the jig contact section 46 if the terminal body 15 of the slider 16 is not in a proper position. Even so, the upper connecting tab 18A is guided by the sloped guide surface 50 of the terminal body 15 in this embodiment. The upper connecting tab 18A slides on the sloped surface. The upper connecting tab 18A is smoothly guided into the wide portion 16A, that is, the slider 16 run on the outer side of the upper connecting tab 18A.

Immediately before the front edges of the upper connecting tab 18A and the lower connecting tab 18B contact the front edge of the upper pressing portion 25A and the lower pressing portion 25B, the front edge of the slider 16 contacts the holding protrusions 28 of the terminal body 15 from the rear and the sidewalls of the slider 16 recover. The holding protrusions 28 of the terminal body 15 are fitted in the temporary receiving holes 26 of the slider 16. The slider 16 is held at the first position relative to the terminal body 15. Through the above steps, the female terminal 12 is prepared (see FIG. 3).

Figure 22:
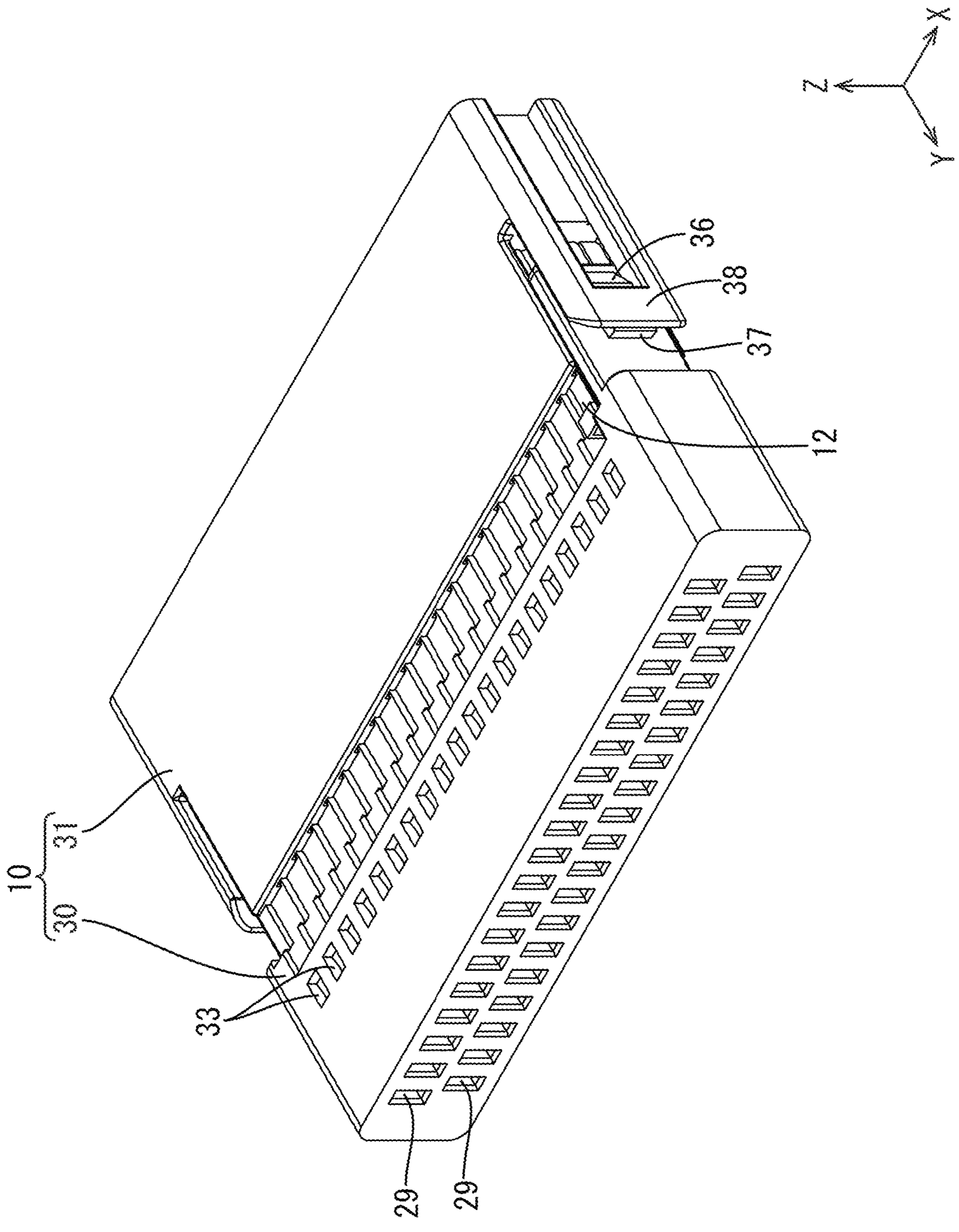
FIG. 22 is a perspective view of the connector housing with a rear holder attached at a temporary position.

The connector housing 30 and the rear holder 31 are prepared by injecting molten synthetic resin and molding into shapes. The connector housing 30 is formed into the shape illustrated in FIG. 19. The connector housing 30 and the rear holder 31 combined into a shape are illustrated in FIG. 22. The female terminal 12 is inserted into the cavity 29 of the connector housing 30 from the rear before the rear holder 31 is attached to the connector housing 30 (see FIGS. 20 and 21).

Figure 23:
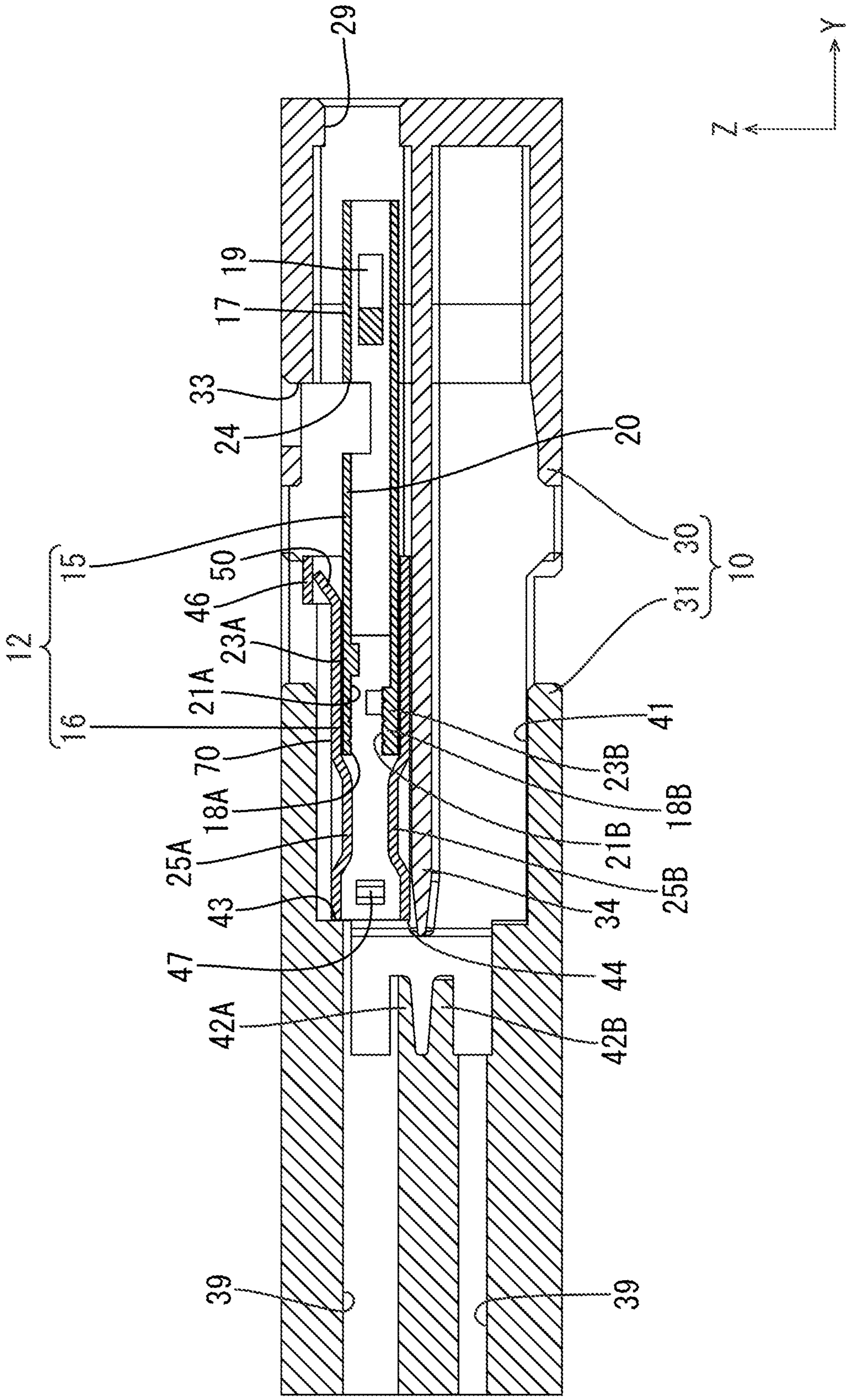
FIG. 23 is a cross-sectional view of the connector housing with a rear holder attached and at the temporary position.
Figure 24:
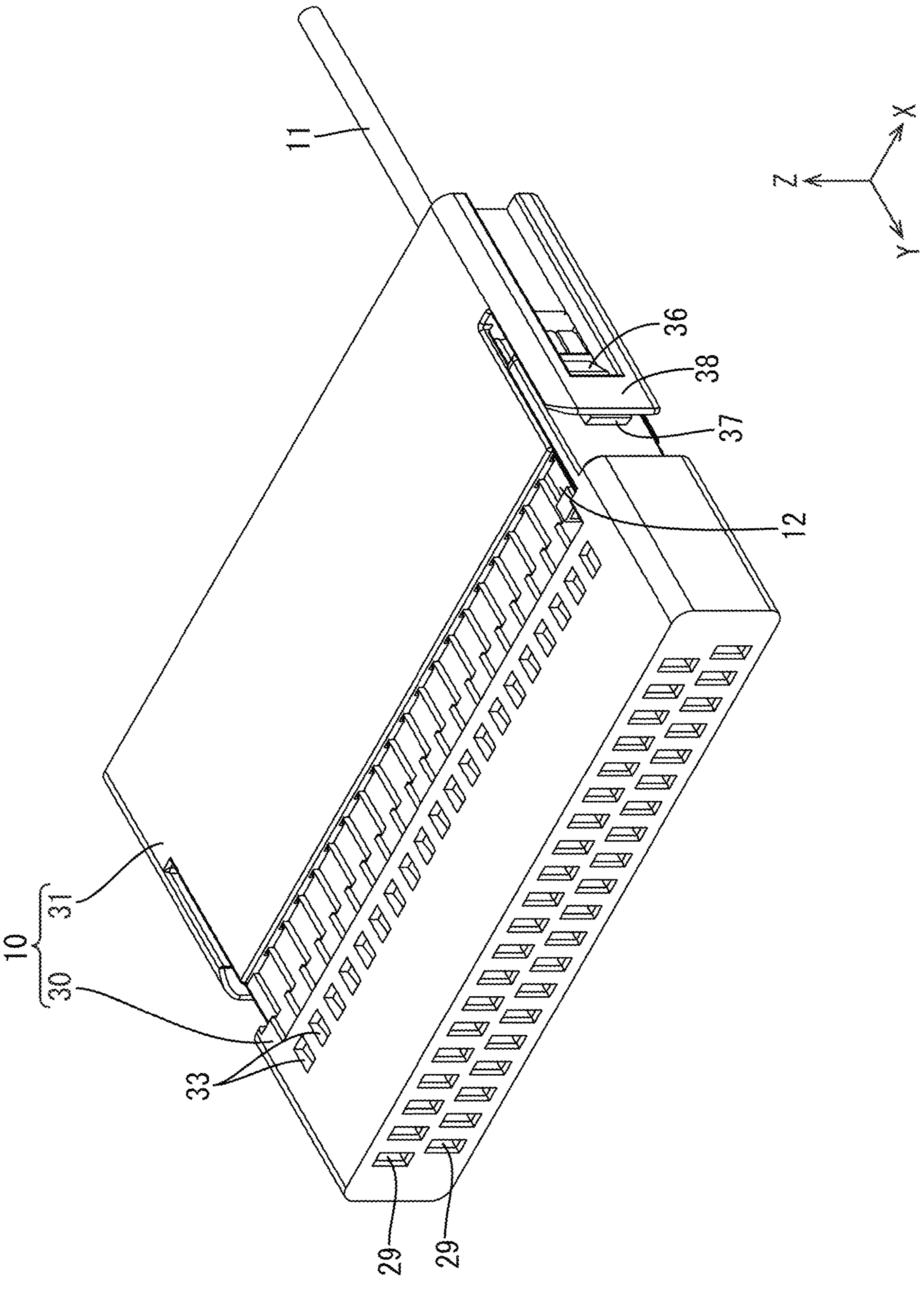
FIG. 24 is a perspective view illustrating an electric wire inserted.

As illustrated in FIGS. 22 and 23, the rear holder 31 is attached to the rear portion of the connector housing 30 from the rear. The front edge of the rear holder 31 contact the temporary holding locks 36 of the connector housing 30 from the rear and the front end of the rear holder 31 deforms to open. The lock receiving portions 38 of the rear holder 31 are elastically fitted to the temporary holding locks 36 of the connector housing 30. The rear holder 31 is held at the temporary holding position relative to the connector housing 30. At this position, the slider pushing portion 43 of the rear holder 31 is in contact with the rear edge of the slider 16 or slightly separated from the rear edge of the slider 16 toward the rear.

The section of the insulating sheath 14 at the end of the electric wire 11 is ripped and a predefined length of the core wire 13 is exposed. The front end of the core wire 13 is inserted into the insertion hole 39 in the rear end of the rear holder 31 from the rear.

When the electric wire 11 is pushed further forward, the front end of the core wire 13 project forward out of the insertion hole 39 of the rear holder 31. The front end of the core wire 13 is passed from the rear edge 44 of the slider 16 to the inner side of the slider 16. The core wire 13 that contacts the guide portions 47 of the slider 16 is guided to the middle section of the slider 16. When the electric wire 11 is pushed further forward, the front end of the core wire 13 enters into the inner side of the terminal body 15 and reaches the gap between the upper connecting tab 18A and the lower connecting tab 18B.

Figure 25:
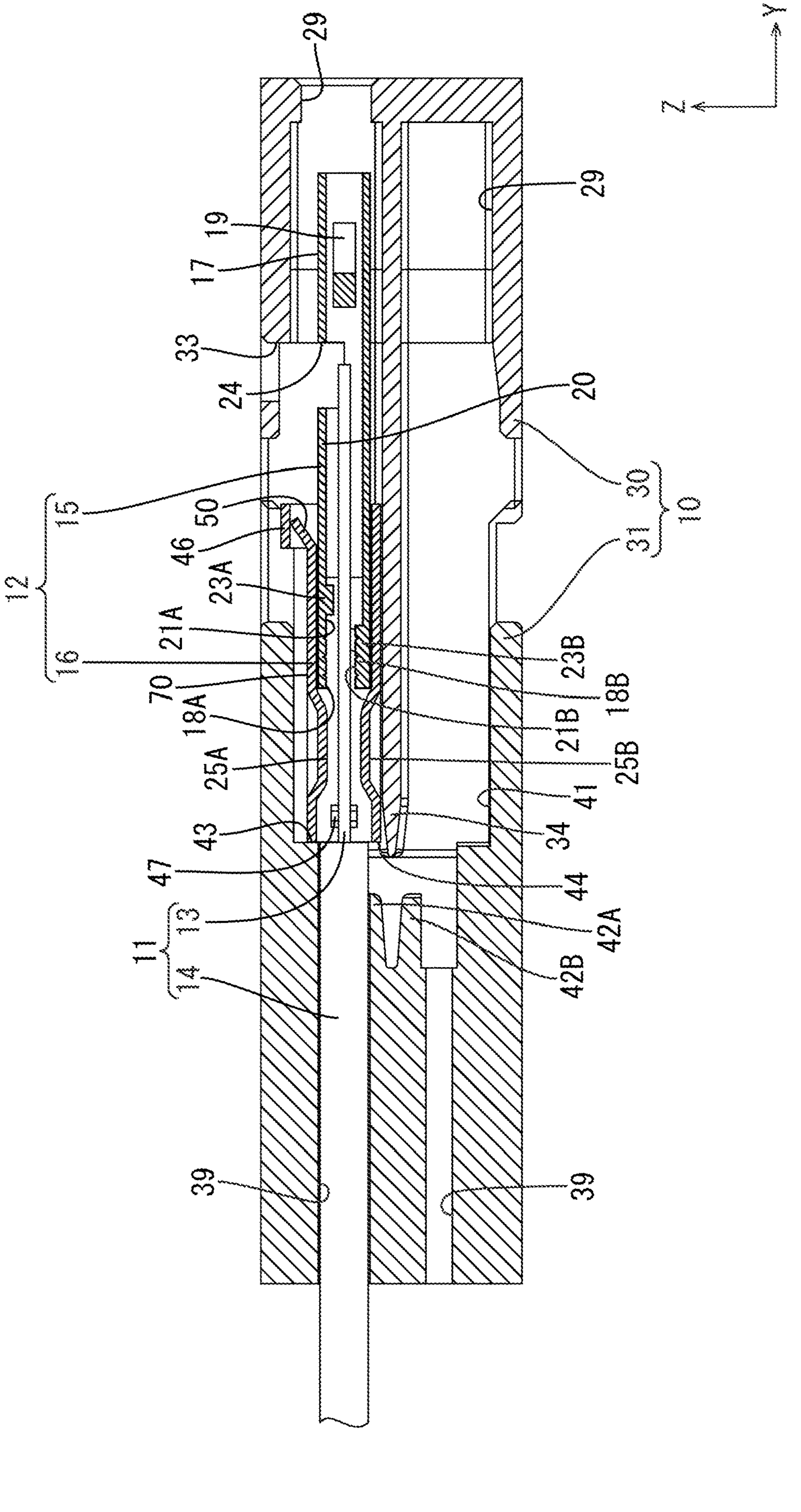
FIG. 25 is a cross-sectional view illustrating the electric wire inserted.

When the electric wire 11 is pushed further forward, the front end of the core wire 13 reaches a point under the terminal window 24 of the terminal body 15 (see FIG. 25). The front end of the core wire 13 is detectable through the terminal window 24 that is visible through the connector window 33. The front end of the core wire 13 may be detected through visual check or with probes. At the position, the insulating sheath 14 of the electric wire 11 in the insertion hole 39 of the rear holder 31.

When the slider 16 is held at the first position relative to the terminal body 15 and the rear holder 31 is held at the temporary holding position relative to the connector housing 30, the distance between the upper connecting tab 18A and the lower connecting tab 18B is greater than the outer diameter of the core wire 13. Therefore, during the insertion of the core wire 13 into the connector 10, the upper connecting tab 18A and the lower connecting tab 18B are less likely to exert friction on the core wire 13. Therefore, a force required to insert the electric wire 11 into the connector 10 does not increase.

When the rear holder 31 is pushed forward, the front end of the rear holder 31 runs on the permanent holding locks 37 of the connector housing 30 and deforms to open. When the rear holder 31 is pushed further forward, the slider pushing portion 43 of the rear holder 31 contacts the rear edge 44 of the slider 16 from the rear. When the rear holder 31 is pushed further forward, the slider 16 is moved forward relative to the terminal body 15 by the slider pushing portion 43. The holding protrusions 28 of the terminal body 15 are released from the temporary receiving holes 26 of the slider 16 and the sidewalls of the slider 16 run on the holding protrusions 28. The sidewall of the slider 16 deform to open.

When the rear holder 31 is pushed further forward, the sidewalls of the slider 16 recover and the holding protrusions 28 of the terminal body 15 are elastically fitted in the permanent receiving holes 27 of the slider 16. The slider 16 is held at the second position relative to the terminal body 15. The permanent holding locks 37 of the connector housing 30 are fitted to the lock receiving portions 38 of the rear holder 31. The rear holder 31 is held at the permanent holding position relative to the connector housing 30 (see FIGS. 1 and 2).

When the slider 16 is at the second position relative to the terminal body 15, the upper pressing portion 25A of the slider 16 presses the upper connecting tab 18A of the terminal body 15 from above to below. The lower pressing portion 25B of the slider 16 pressed the lower connecting tab 18B of the terminal body 15 from below to above. Namely, the core wire 13 is sandwiched between the upper connecting tab 18A and the lower connecting tab 18B in the top-bottom direction.

The serrations 22A in the lower surface of the upper connecting tab 18A and the serrations 22B in the upper surface of the lower connecting tab 18B dig into the oxide film on the surface of the core wire 13 and remove the oxide film. As a result, a metal surface of the core wire 13 is exposed. With the metal surface contacting the upper connecting tab 18A and the lower connecting tab 18B, the electric wire 11 is electrically connected to the female terminal 12.

When the core wire 13 is sandwiched between the upper connecting tab 18A and the lower connecting tab 18B in the top-bottom direction, the core wire 13 is held in a posture that the core wire 13 is extended in the front-rear direction and the bent in the top-bottom direction. The core wire 13 is firmly held. Therefore, even when the electric wire 11 is pulled, the electric wire 11 is held by the female terminal with a sufficient strength.

Second Example of Assembling of the Connector 10

A second example of assembling of the connector 10 according to this embodiment will be described. In this production process, the rear holder 31 is moved forward after the jig 45 is brought into contact with the jig contact section 46 from the rear as illustrated in FIG. 26 and the slider 16 is slid forward.

Figure 26:
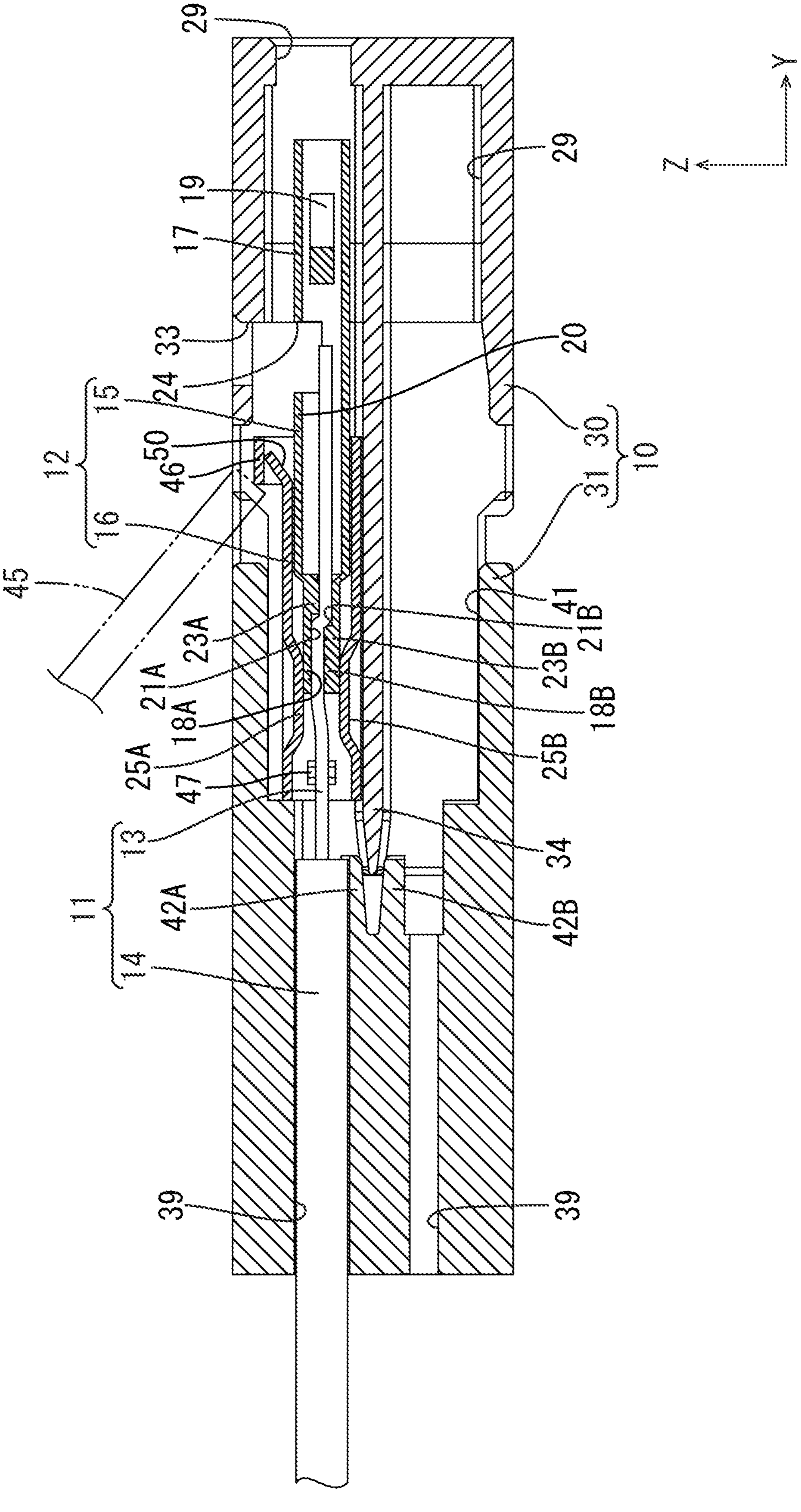
FIG. 26 is a cross-sectional view illustrating the slider moved from the first position to the second position.

As illustrated in FIG. 26, the slider 16 may be stopped between the first position and the second position during the movement of the slider 16 to the second position. The electrical connection between the core wire 13 and the upper connecting tab 18A and the lower connecting tab 18B is not sufficient. This is because the upper connecting tab 18A and the lower connecting tab 18B do not sufficiently press the core wire 13. If the rear holder 31 is moved from the first position to the second position, the rear holder 31 may not be moved to the permanent holding position because the slider pushing portion 43 of the rear holder 31 contacts the rear edge of the slider 16. Namely, whether the slider 16 is moved to the second position, that is, whether the electrical connection is properly established between the electric wire 11 and the terminal body 15 can be determined.

Steps of the assembly other than those described above are similar to those of the first example and thus will not be described.

Operation and Effect of this Embodiment

Next, operation and effect of this embodiment will be described. The female terminal 12 according to this embodiment includes the terminal body 15 and the slider 16. The electric wire 11 is insertable into the female terminal 12 in the Y-axis direction. The terminal body 15 includes the upper connecting tab 18A and the lower connecting tab 18B. The upper connecting tab 18A and the lower connecting tab 18B includes the contact surfaces 21A and 21B that can contact the electric wire 11. The upper connecting tab 18A and the lower connecting tab 18B are deformable in the direction that crosses the inserting direction in which the electric wire 11 is inserted. The slider 16 has the tubular shape. The slider 16 is slidable from a separated position that is separated from the terminal body 15 to an overlapping position at which the slider 16 overlaps the terminal body 15 from the outer side while the slider 16 contacts the terminal body 15 from the front ends of the upper connecting tab 18A and the lower connecting tab 18B. The slider 16 includes the upper pressing portion 25A and the lower pressing portion 25B that protrude inward. The upper pressing portion 25A and the lower pressing portion 25B press the upper connecting tab 18A and the lower connecting tab 18B so that the upper connecting tab 18A and the lower connecting tab 18B contact the electric wire 11. The slider 16 includes the narrow portion 16B and the wire portion 16A. The narrow portion 16B is in the area in which the upper pressing portion 25A and the lower pressing portion 25B are provided. The narrow portion 16B has the smaller inner dimension in the pressing direction in which the upper pressing portion 25A and the lower pressing portion 25B press the electric wire 11. The wide portion 16A is in front of the upper pressing portion 25A and the lower pressing portion 25B in the inserting direction. The wide portion 16A has the larger inner dimension in the pressing direction in comparison to the narrow portion 16B. The upper pressing portion 25A and the lower pressing portion 25B press the upper connecting tab 18A and the lower connecting tab 18B when the narrow portion 16B overlaps the upper connecting tab 18A and the lower connecting tab 18B from the outer side at the overlapping position. The slider 16 includes the sloped guide surface 50. The sloped guide surface 50 is angled at the front edge of the upper wall 70 that defines the wide portion 16A to spread further than the wide portion 16A with respect to the pressing direction toward the front with respect to the inserting direction in which the electric wire 11 is inserted.

The terminal wire assembly 60 according to this embodiment includes the female terminal 12 and the electric wire 11 that is coupled to the female terminal 12.

According to the configuration, the upper connecting tab 18A and the lower connecting tab 18B press the core wire 13 when the slider 16 is slid in the inserting direction. The core wire 13 is electrically connected to the upper connecting tab 18A and the lower connecting tab 18B. Namely, the electric wire 11 is electrically connected to the female terminal 12 without using a relatively large jig such as dies.

In this embodiment, the upper pressing portion 25A and the lower pressing portion 25B of the slider 16 are movable between a contact position and the separated position. At the contact position, the upper pressing portion 25A and the lower pressing portion 25B contact the upper connecting tab 18A and the lower connecting tab 18B, respectively. At the separated position, the upper pressing portion 25A and the lower pressing portion 25B are separated from the upper connecting tab 18A and the lower connecting tab 18B, respectively.

According to the configuration, the electric wire 11 is electrically connected to the female terminal 12 by moving the slider 16 relative to the terminal body 15 from the separated position to the contact position, that is, by simple operation.

In this embodiment, the slider 16 includes the sloped guide surface 50. With the upper connecting tab 18A slid on the sloped surface, the terminal body 15 is smoothly inserted into the wide portion 16A of the slider 16. The slider 16 is guided so that the slider 16 runs on the outer side of the upper connecting tap 18A. According to the configuration, attachment of the slider 16 to the terminal body 15 can be easily and properly performed in advance.

Further, the sloped guide surface 50 is immediately below the jig contact section 46 of the slider 16. Therefore, the sloped guide surface 50 is less likely to touch other components resulting in damages or deformation when the slider 16 is handled alone. Examples of other components include the terminal body 15, the connector housing 30, the rear holder 31, and the jig 45. Still further, the female terminal 12 can be reduced in size in comparison to a configuration in which a component to cover the sloped guide surface 50 is provided separately from the jig contact section 46.

In this embodiment, the slider 16 has the tubular shape that extends in the inserting direction. The slider 16 includes the guide portions 47 closer to the rear edge of the slider 16 with respect to the inserting direction. Each guide portion 47 is narrowed toward the front with respect to the inserting direction. The core wire 13 of the electric wire 11 slides on the guide portions 47 and thus the electric wire 11 is guided to the inner side of the slider 16.

According to the configuration, the core wire 13 can be easily inserted into the slider 16 by sliding the core wire 13 on the guide portions 47.

In this embodiment, the slider 16 includes the jig contact section 46 that protrudes outward. With the jig contact section 46 pushed by the jig 45 in the inserting direction from the rear, the slider 16 slides forward in the inserting direction.

According to the configuration, the electric wire 11 is electrically connected to the female terminal 12 by pushing the slider 16 forward in the inserting direction with the jig 45 contacting the jig contact section 46.

In this embodiment, the upper holding protrusion 23A protrudes from the contact surface 21A of the upper connecting tab 18A and the lower holding protrusion 23B protrudes from the contact surface 21B of the lower connecting tab 18B. The upper holding protrusion 23A and the lower holding protrusion 23B contact the core wire 13 of the electric wire 11 and hold the core wire 13 bent in the direction that crosses the inserting direction.

According to the configuration, the core wire 13 remains bent in the direction that crosses the inserting direction with the upper holding protrusion 23A and the lower holding protrusion 23B. Even if the electric wire 11 is pulled, the upper holding protrusion 23A and the lower holding protrusion 23B receive a force to pull the electric wire 11. According to the configuration, the electric wire 11 is firmly held by the female terminal 12.

The serrations 22A and 22B are formed in the contact surfaces 21A and 21B, respectively. The serrations 22A and 22B dig into the surface of the core wire 13 when the upper connecting tab 18A and the lower connecting tab 18B press the core wire 13.

With the serrations 22A and 22B digging into the surface of the core wire 13, the strength of the female terminal 12 to hold the core wire 13 increases. Further, an insulating film formed on the surface of the core wire 13 is ripped by the serrations 22A and 22B. Therefore, an electrical resistance between the core wire 13 and the female terminal 12 can be reduced.

The serrations 22A and 22B include the grooves that extend in the direction that is perpendicular to the inserting direction. The grooves are arranged at intervals in the inserting direction.

According to the configuration, the core wire 13 is held at multiple points by the serrations 22A and 22B with respect to the inserting direction in which the electric wire 11 is inserted. Therefore, the strength of the female terminal 12 to hold the core wire 13 increases. Further, the core wire 13 is electrically connected to the female terminal 12 at the multiple points by the serrations 22A and 22B with respect to the inserting direction. Therefore, the electrical resistance between the core wire 13 and the female terminal 12 can be reduced.

In this embodiment, the wire guide recess 48 is formed in the contact surface 21B to extend in the inserting direction.

According to the configuration, the core wire 13 is easily disposed in the contact surface 21B by placing the core wire 13 in the wire guide recess 48.

In this embodiment, the terminal body 15 includes the terminal window 24 through which whether the edge of the core wire 13 is place at a predefined position is detectable when the core wire 13 is disposed between the upper connecting tab 18A and the lower connecting tab 18B.

According to the configuration, wither the core wire 13 is placed at the predefined position and coupled to the female terminal 12 is easily confirmed by detecting the edge of the core wire 13 through the terminal window 24.

In this embodiment, the terminal body 15 includes the holding protrusions 28 and the slider 16 includes the temporary receiving holes 26 and the permanent receiving holes 27. When the holding protrusions 28 are fitted in the temporary receiving holes 26, the slider 16 is held at the temporary holding position. When the holding protrusions 28 are fitted in the permanent receiving holes 27, the slider 16 is held at the permanent holding position.

According to the configuration, the slider 16 is held at the temporary holding position or the permanent holding position relative to the terminal body 15.

The connector 10 according to this embodiment includes the connector housing 30 and the rear holder 31. The connector housing 30 includes the cavities 29 in which female terminals 12 are held. The rear holder 31 is attached to the rear portion of the connector housing 30. The rear portion of the rear holder 31 includes insertion holes 39 that communicate with the cavities 29.

According to the configuration, the female terminals 12 is held in the connector housing 30 while removal of the female terminals from the connector housing 30 is restricted by the rear holder 31.

In this embodiment, the slider 16 includes the upper pressing portion 25A and the lower pressing portion 25B. The upper pressing portion 25A contacts the upper connecting tab 18A on an opposite side from the contact surface 21A. The lower pressing portion 25B contacts the lower connecting tab 18B on an opposite side from the contact surface 21B. The slider 16 is slidable between the first position and the second position. At the first position, the upper pressing portion 25A and the lower pressing portion 25B are separated from the upper connecting tab 18A and the lower connecting tab 18B, respectively. At the second position, the upper pressing portion 25A and the lower pressing portion 25B contact the upper connecting tab 18A and the lower connecting tab 18B, respectively. The rear holder 31 is movable in the inserting direction. The front end of the rear holder 31 with respect to the inserting direction includes the slider pushing portion 43. The slider pushing portion 43 contacts the slider 16 from the rear with respect to the inserting direction and pushes the slider 16 forward with respect to the inserting direction to move the slider 16 to the contact position when the rear holder 31 is moved from the rear to the front with respect to the inserting direction.

According to the configuration, the slider 16 is pushed by the slider pushing portion 43 of the rear holder 31 when the rear holder 31 is moved. Namely, the electric wire 11 is electrically connected to the female terminal 12 concurrently with the movement of the rear holder 31.

In this embodiment, the rear holder 31 is movable in the front-rear direction. The front end of the rear holder 31 includes the slider pushing portion 43. The slider pushing portion 43 contacts the slider 16 from the rear and pushes the slider 16 forward to move the slider 16 to the permanent holding position when the rear holder 31 is moved from the rear to the front.

According to the configuration, the slider 16 is pushed by the slider pushing portion 43 of the rear holder 31 when the rear holder 31 is moved from the rear to the front. Namely, the slider 16 is moved to the second position. The upper pressing portion 25A and the lower pressing portion 25B of the slider 16 contact the upper connecting tab 18A and the lower connecting tab 18B, respectively. The upper pressing portion 25A and the lower pressing portion 25B of the slider 16 press the upper connecting tab 18A and the lower connecting tab 18B toward the core wire 13. The upper connecting tab 18A and the lower connecting tab 18B deform and contact the core wire 13. Therefore, the electric wire 11 is electrically connected to the female terminal 12. According to the configuration, the electric wire 11 is electrically connected to the female terminal 12 by moving the rear holder 31 from the rear to the front with respect to the inserting direction, that is, by a single step.

In this embodiment, the front end of the rear holder 31 with respect to the inserting direction contacts the jig contact section 46 of the slider 16 when the slider 16 does not reach the second position.

According to the configuration, a condition in which the slider 16 does not reach the second position, that is, the connection between the core wire 13 and the female terminal 12 is not complete is detectable based on the contact of the front end of the rear holder 31 with the jig contact section 46 of the slider 16.

In this embodiment, the terminal body 15 includes the terminal window 24. When the core wire 13 is between the upper connecting tab 18A and the lower connecting tab 18B, the end of the core wire 13 is visible from outside through the terminal window 24.

According to the configuration, the end of the core wire 13 in the female terminal 12 is visible through the terminal window 24 and thus whether the core wire 13 is at the predefined position relative to the upper connecting tab 18A and the lower connecting tab 18B is easily inspected.

In this embodiment, the connector housing 30 includes the connector windows 33 through which the terminal windows 24 of the female terminals 12 are visible from outside.

According to the configuration, the end of the core wire 13 in the female terminal 12 is visible through the connector window 33 and thus whether the core wire 13 is at the predefined position relative to the connecting tab 18 is easily inspected.

Other Embodiments

The technology described herein is not limited to the embodiment described above and illustrated in the drawings. The following embodiments may be included in the technical scope of the technology described herein.

(1) In the above embodiment, the upper connecting tab 18A and the lower connecting tab 18B are included in each terminal body 15. However, each terminal body 15 may include a single connecting tab or three or more connecting tabs.

(2) In the above embodiment, the terminal is the female terminal 12. However, the terminal may be a male terminal or a ring terminal the includes a round plate-shaped connecting portion with a bolt insertion hole.

(3) In the above embodiment, the terminal body 15 includes the terminal window 24 and the connector housing 30 includes the connector windows 33. However, the terminal window 24 and the connector windows 33 may be omitted.

(4) In the above embodiment, the rear holder 31 includes the guide portions 47 at the edges of the insertion holes 39. However, the guide portions 47 may be omitted.

(5) In the above embodiment, the rear holder 31 includes the slider pushing portion 43 to push the slider 16. However, the slider pushing portion 43 may be omitted.

(6) In the above embodiment, the cavities 29 are in the double-tier arrangement. However, the cavities 29 may be in a single-tier arrangement or triple-or-more-tier arrangement.

(7) In the above embodiment, the slider 16 is made of metal. However, the slider 16 may be made of any material such as synthetic resin and ceramic.

(8) In the above embodiment, the upper connecting tab 18A and the lower connecting tab 18B are elastically deformable. However, the upper connecting tab 18A and the lower connecting tab 18B may be plastically deformable.

(9) In the above embodiment, the electric wire 11 ins a covered electric wire that includes the core wire 13 covered with the insulating sheath 14. However, the electric wire 11 may be a bare electric wire.

(10) In the above embodiment, the slider 16 has a rectangular tubular shape. However, the slider 16 may have a round tubular shape or a polygonal shape such as a triangular tubular shape, a pentagonal tubular shape, and a hexagonal tubular shape. The shape is not limited to a tubular shape.

(11) In the above embodiment, the slider 16 include the temporary receiving holes 26. However, the temporary receiving holes 26 may be omitted.

(12) In the above embodiment, the jig contact section 46 functions as the cover. However, a cover that covers the sloped guide surface 50 may be provided separately from the jig contact section 46.

(13) The terminal may include one connecting tab or three or more connecting tabs.

EXPLANATION OF SYMBOLS

10: Connector
11: Electric wire
12: Female terminal
13: Core wire
14: Insulating sheath
15: Terminal body
16: Slider
16A: Wide portion
16B: Narrow portion
17: Tubular connecting portion
18: Connecting tab
18A: Upper connecting tab
18B: Lower connecting tab
19: Elastic connecting tab
20: Base portion
21A: Contact surface
21B: Contact surface
22A: Serration
22B: Serration
23A: Upper holding portion
23B: Lower holding portion
24: Terminal window
25A: Upper pressing portion
25B: Lower pressing portion
26: Temporary receiving hole
26A: First position holding mechanism
26B: Second position holding mechanism
27: Permanent receiving hole
28: Holding protrusion
29: Cavity
30: Connector housing
31: Rear holder
33: Connector window
34: Diving wall
35: Partition wall
36: Temporary holding lock
37: Permanent holding lock
38: Lock receiving portion
39: Insertion hole
41: Hood portion
42A, 42B: Projection wall
43: Slider pushing portion
44: Rear edge
45: Jig
46: Jig contact section
47: Guide portion
48: Wire guide recess
50: Sloped guide surface
60: Terminal wire assembly
70: Upper wall

The invention claimed is:

1. A terminal comprising:

a terminal body into which an electric wire is inserted in a predefined direction, the terminal body including:
    connecting tabs deformable in a direction crossing an inserting direction in which the electric wire is inserted, the connecting tabs including contact surfaces contactable with the electric wire; and
a slider slidable between a separated position at which the slider is separated from the terminal body and an overlapping position at which the slider overlaps the terminal body from an outer side while the slider contacts the terminal body from front ends of the connecting tabs,
the slider including:
    pressing portions that protrude inward and press the connecting tabs to contact the electric wire, wherein
the slider includes a narrow portion and a wide portion,
the narrow portion is in an area in which the pressing portions are provided,
the narrow portion has a less inner dimension in a pressing direction in which the pressing portions press the electric wire,
the wide portion is in front of the pressing portions with respect to the inserting direction,
the wide portion has a greater inner dimension in the pressing direction than the narrow portion, the pressing portions press the connecting tabs when the narrow portion is at the overlapping position and overlaps the connecting tabs from the outer side, and the slider includes a sloped guide surface that is angled at an edge of a wall that defines the wide portion to spread further than the wide portion with respect to the pressing direction toward a front with respect to the inserting direction.

2. The terminal according to claim 1, wherein the contact surfaces of the connecting tabs are opposite to each other, and at least one of the connecting tabs is slid on the sloped guide surface and guided into the slider.

3. The terminal according to claim 1, wherein one of the terminal body and the slider or another one of the terminal body and the slider includes a first position holding mechanism and a second position holding after, the first position holding mechanism holds the slider at a first position at which the wide portion overlaps the terminal body from the outer side and the narrow portion does not overlap the connecting tabs from the outer side, and the second position holding after holds the slider at a second position at which the narrow portion overlaps the connecting tabs from the outer side and the pressing portions press the connecting tabs to contact the electric wire.

4. The terminal according to claim 1, wherein the slider includes a covering section that cover the sloped guide surface.

5. The terminal according to claim 1, wherein the slider includes a jig contact section that receives an external jig to move the slider in the inserting direction.

6. The terminal according to claim 5, wherein the jig contact section functions as a covering section that covers the sloped guide surface.

* * * * *